US011909792B2

(12) United States Patent
Bologh

(10) Patent No.: US 11,909,792 B2
(45) Date of Patent: *Feb. 20, 2024

(54) VIDEO DELIVERY EXPEDITION SYSTEMS, MEDIA AND METHODS

(71) Applicant: Mark J Bologh, Township of Washington, NJ (US)

(72) Inventor: Mark J Bologh, Township of Washington, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 17/749,710

(22) Filed: May 20, 2022

(65) Prior Publication Data

US 2022/0286490 A1    Sep. 8, 2022

Related U.S. Application Data

(63) Continuation of application No. 16/948,208, filed on Sep. 8, 2019, now abandoned, which is a continuation of application No. 16/287,644, filed on Feb. 27, 2019, now Pat. No. 10,791,159, which is a continuation of application No. 15/620,793, filed on Jun. 12, 2017, now Pat. No. 10,264,041, which is a continuation of application No. 13/684,111, filed on Nov. 21, 2012, now Pat. No. 9,749,376, which is a (Continued)

(51) Int. Cl.
*H04L 69/329* (2022.01)
*H04L 65/60* (2022.01)
*H04N 21/262* (2011.01)
*H04N 21/433* (2011.01)
*H04N 21/472* (2011.01)
*H04N 21/845* (2011.01)

(52) U.S. Cl.
CPC ............ *H04L 65/60* (2013.01); *H04L 69/329* (2013.01); *H04N 21/26216* (2013.01); *H04N 21/26225* (2013.01); *H04N 21/26233* (2013.01); *H04N 21/4331* (2013.01); *H04N 21/47202* (2013.01); *H04N 21/8456* (2013.01)

(58) Field of Classification Search
CPC . H04L 65/60; H04L 69/329; H04N 21/26225; H04N 21/26233; H04N 21/8456
USPC ................ 709/220, 224, 225, 227, 226, 228
See application file for complete search history.

(56) References Cited

U.S. PATENT DOCUMENTS

| | | | |
|---|---|---|---|
| 7,054,547 B1* | 5/2006 | Abecassis .............. | H04N 7/163 386/282 |
| 7,693,621 B1* | 4/2010 | Chamas .............. | G08G 5/0065 701/16 |
| 9,521,178 B1* | 12/2016 | Gigliotti ............ | H04L 43/0894 |

(Continued)

FOREIGN PATENT DOCUMENTS

| | | | | | |
|---|---|---|---|---|---|
| AU | 2012294372 A1 * | 3/2014 | ............ | G06F 21/10 |
| EP | 3041194 A2 * | 7/2016 | ............ | G05B 15/02 |

*Primary Examiner* — Khanh Q Dinh
(74) *Attorney, Agent, or Firm* — Aldo Noto; Rimon PC

(57) ABSTRACT

The VIDEO DELIVERY EXPEDITION APPARATUSES, METHODS AND SYSTEMS ("VDE") transform Internet content data access request via VDE components into media content playback at a client device. In one implementation, the VDE may issue a notification or a user interface element to a user after delivery of a process one data from the server to a client; and trigger a background delivery of a process two data, wherein the triggering occurs when the user initiates playback of said process one data.

46 Claims, 9 Drawing Sheets

Related U.S. Application Data continuation-in-part of application No. PCT/US2011/037453, filed on May 20, 2011.

(60) Provisional application No. 61/347,346, filed on May 21, 2010.

(56) References Cited

U.S. PATENT DOCUMENTS

| | | | |
|---|---|---|---|
| 9,614,977 B1 * | 4/2017 | Bond | H04M 11/066 |
| 9,749,376 B2 * | 8/2017 | Bologh | H04N 21/26225 |
| 10,263,041 B2 * | 4/2019 | Sargent | B82Y 30/00 |
| 10,791,159 B2 * | 9/2020 | Bologh | H04N 21/47202 |
| 11,632,498 B1 * | 4/2023 | Mowry | H04N 23/90 |
| | | | 348/222.1 |
| 2005/0097046 A1 * | 5/2005 | Singfield | G06Q 20/1085 |
| | | | 705/42 |
| 2006/0110136 A1 * | 5/2006 | Abecassis | H04N 21/47 |
| | | | 348/E7.071 |
| 2013/0080516 A1 * | 3/2013 | Bologh | H04N 21/47202 |
| | | | 709/203 |
| 2016/0012465 A1 * | 1/2016 | Sharp | G06Q 20/321 |
| | | | 705/14.17 |
| 2016/0021930 A1 * | 1/2016 | Minskoff | A24F 40/51 |
| | | | 392/395 |
| 2018/0124143 A1 * | 5/2018 | Bologh | H04N 21/26233 |
| 2018/0296777 A1 * | 10/2018 | Terry | A61M 11/042 |

\* cited by examiner

VIDEO DELIVERY EXPEDITION SYSTEMS, MEDIA AND METHODS

This application for letters patent discloses and describes various novel innovations and inventive aspects of VIDEO DELIVERY EXPEDITION technology (hereinafter "VDE") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

PRIORITY CLAIMS

This application is a continuation of U.S. application Ser. No. 16/948,208 filed Sep. 8, 2020 entitled "Video Delivery Expedition Apparatuses, Methods and Systems", which is a continuation of U.S. application Ser. No. 16/287,644 filed Feb. 27, 2019, now U.S. Pat. No. 10,791,159 entitled "Video Delivery Expedition Systems, Media, and Methods", which is a continuation of U.S. application Ser. No. 15/620,793 filed Jun. 12, 2017, now U.S. Pat. No. 10,264,041 entitled "Video Delivery Expedition Systems, Media, and Methods", which is a continuation of U.S. application Ser. No. 13/684,111 filed Nov. 21, 2012, now U.S. Pat. No. 9,749,376 entitled "Video Delivery Expedition Apparatuses, Methods and Systems", which is a continuation-in-part of Patent Cooperation Treaty international application PCT/US2011/037453 filed May 20, 2011 entitled "Internet System For Ultra High Video Quality", which claims priority from U.S. provisional application 61/347,346 filed May 21, 2010 entitled "Internet System For Ultra High Video Quality".

The entire contents of the aforementioned applications are expressly incorporated by reference herein.

FIELD

The present innovations generally address apparatuses, methods, and systems for video transmission and streaming over a network, and more particularly, include VIDEO DELIVERY EXPEDITION APPARATUSES, METHODS AND SYSTEMS ("VDE").

BACKGROUND

A user downloads video contents from the Internet. The user initiates the downloading when the user clicks on a user interface element, such as a "download" button within an Internet browser window, which triggers the delivery of video data from a server to the user's client device, such as a personal computer. A large video file, such as a go-minute high definition movie file, takes hours to download when the Internet speed is 2 Mbps. After completing the download of the entirety of the video file, the user can play the video file locally stored on the personal computer.

BRIEF DESCRIPTION OF THE DRAWINGS

The accompanying appendices, drawings, figures, images, etc. illustrate various example, non-limiting, inventive aspects, embodiments, and features ("e.g.," or "example(s)") in accordance with the present disclosure.

Figure 1:
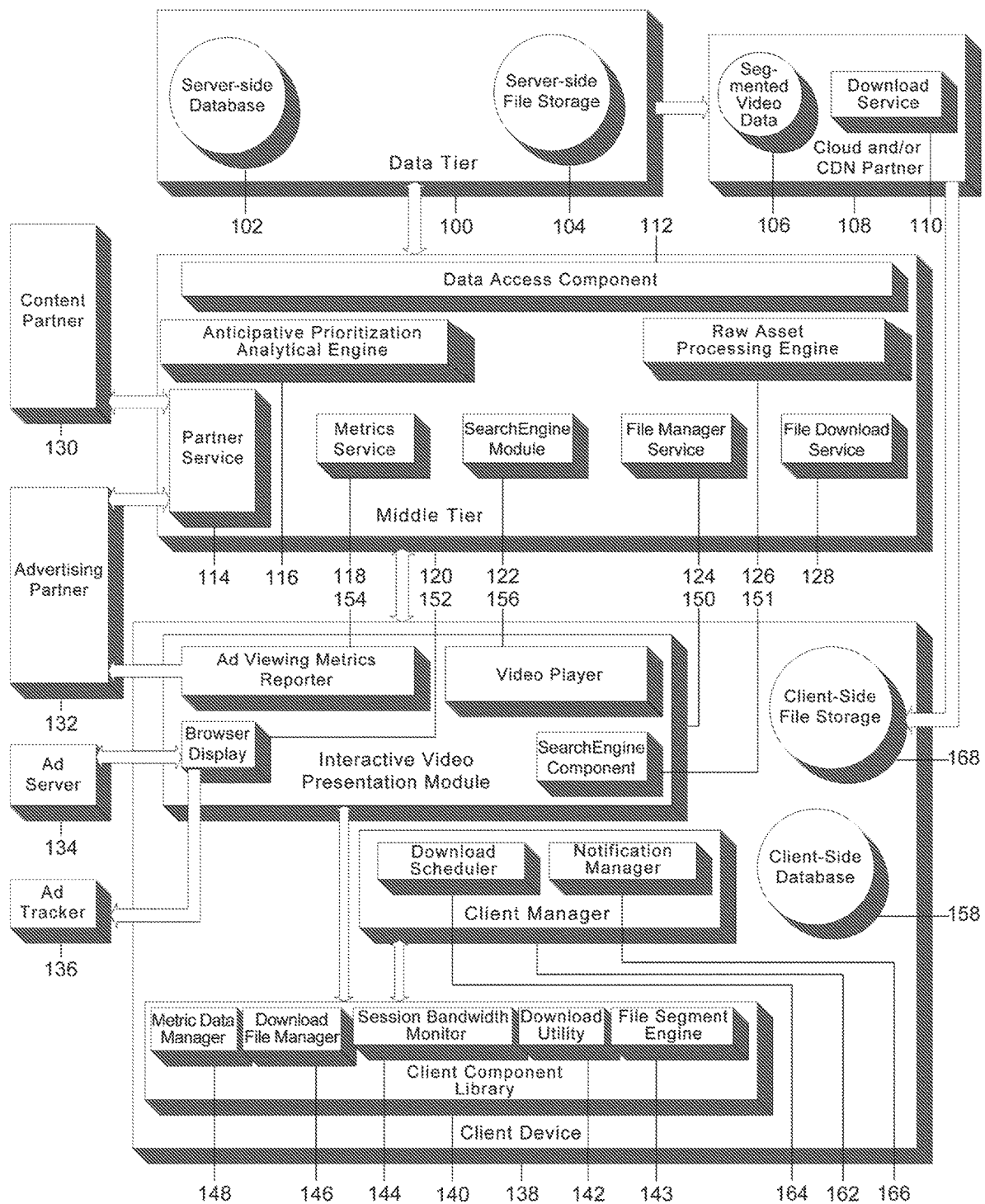
FIG. 1 is illustrative of a high level overview showing the tiers and components that comprise the content delivery system of one non-limiting embodiment, for both the server-side and the client-side of the architecture within embodiments of the VDE.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

The VIDEO DELIVERY EXPEDITION technology (hereinafter "VDE") provides a media content file downloading and streaming platform.

Within embodiments, there may be different ways that users may receive data, including video data, over the Internet and other networks. Conventional playback of transmitted data, including for example in the case of video data, streaming, download and play, progressive download and play, automatic download and play, and variations thereof are all deficient. An example is "streaming" video, which is engaged when the user clicks on some type of user interface (UI) element (for example a thumbnail image). When the user clicks on the UI element, this action initiates the delivery of the video data from the server to the client-device. The problem with this type of system is that the quality of the user's video experience is limited by the "data throughput rate" (generally referred to as "bandwidth") at which data may be transferred from the server to the client device.

Another way users interact with Internet video is through an automatic background delivery system. In this scenario, the user opts-in to receive content from a content provider. The video clip is then automatically sent to the user. After an entire video file is received and stored by the user's client device, the user may be alerted with some type of notification informing them that the entire video has been downloaded to their device and is ready for viewing. The problem with this type of system is that all of the bandwidth and all of the storage resources necessary for delivery may be fully utilized prior to the user engaging the content. This is not an efficient utilization of resources, for both the end user and the server-side system. Thus, such video downloading method is inefficient by occupying all bandwidth and incurs significant latency in user experience.

It has been reported that as of June 2010, there were more than 266,000,000 active Internet users in North America alone and nearly 2,000,000,000 users of the Internet worldwide. As the sheer number of users among networks, including the Internet, continues to grow, there remains a need to further enhance the transmission and presentation of data to users within these networks.

Within implementations, the subject matter described herein may include unique solutions that provide an extraordinary data playback experience for all users of a network, including in the case of the Internet the average Internet user with average bandwidth. This disclosure overcomes limitations inherent with current data transmission systems, including video systems, and also provides unique solutions to support massive users of a network, including for example the Internet. The subject matter described herein is applicable to many applications including high-definition television and also the evolving mobile market. The subject matter provided herein also addresses the imminent advances in "smart" mobile devices and technologies. This disclosure is also designed to facilitate next-generation data-intensive formats, including as examples video platforms containing higher resolution screens that exceed the current Blu-ray™ specification, and emerging 3D technologies and display devices. Various embodiments of the VDE may include (also further discussed in FIGS. 1-9):

Encoding and Bit-Rate

From start to finish, a video workflow may be viewed as having 3 stages: Production, Editing, and Output. Production is the stage in which the images are acquired, either with a film or digital camera. Editing is the stage in which frames are manipulated, usually with non-linear editing software that runs on a computer. Output is the final stage of postproduction when the final edited version is compressed to an Output File that is usually much smaller in data size than the Editing File. This may be done with "lossless" encoding (that uses algorithms to reduce file size) or with "lossy" encoding (that pulls out pixel data correlating to either color or luminance).

When the video or film is produced, the Production Format should support a resolution that is greater or equal to the Output Format. "Resolution" refers to the total number of pixels. For example, Blu-ray™ video resolution is 1920 horizontal pixels multiplied by 1080 vertical pixels, with all pixels present in every frame.

Resolution and quality are actually separate concepts. For example, an Editing File may have the same exact resolution as an Output File. However, the Editing File will usually be comprised of much more data and thus much higher quality. This is because the amount of data attributed to each pixel in the Output File is usually much less, even though it may have the same number of pixels. The total amount of data assigned to the Output file may be set at different rates. "Bit-rate" refers to the number of bits per second, usually measured in Megabits per second (Mbps).

If the Output file is intended for streaming over the Internet, the bit-rate may be low enough to allow a sufficient "buffer". Determining the optimum bit-rate for the Output File is largely a function of estimating the end user's bandwidth (and also cost variables since larger Output Files often incur greater bandwidth costs for the content provider).

True Streaming

True Streaming is a type of video delivery in which the video signal arrives in real time and is displayed to the viewer immediately.

True streaming over an Internet Protocol (IP) network starts by taking a digital video signal and breaking it up into IP packets. Generally the video content has been compressed using some form of encoding format. These packets are then streamed out over the network, which means that the packets are sent at a data rate that matches the rate of the video. For example, a video content piece that is 96 seconds in length will take 96 seconds to stream. Specialized software, called player software, accepts the incoming packets and creates an image on the viewing device.

Realtime Transport Protocol (RTP) defines a packet format and a standard method for transmitting audio and video streams over TCP/IP. Although the name implies that it's a transport protocol, in reality RTP doesn't replace the primary transport protocols of TCP/IP but instead is built on top of UDP, which is often referred to as a "fast and dirty" protocol of the TCP/IP Transport Layer.

UDP is not as reliable as TCP. In order to compensate for this, RTP uses an accompanying protocol called Realtime Control Protocol (RTCP) that provides the function of monitoring the quality of service for an RTP session. This allows the application to make adjustments to the stream. For example, the flow rate of the stream may be varied or the stream may be switched to a less resource-intensive format or resolution.

Streaming applications often use some form of buffering to ensure a steady stream of packets. A buffer is a block of memory used for temporarily storing data as it is received. Buffering allows the application to process input at a steady rate even though the arrival rate might vary. As long as the buffer is never totally empty or totally full, the application receiving the data may process input at a constant rate.

Download and Play

Download and Play (D+P) takes a video content file and delivers it to a viewing device, where it may then be decoded and displayed. The user is simply saving the file to their machine, and after download is complete they may launch a media application to display the video.

D+P is very similar to the process used by websites, where user browsers are constantly requesting web pages from a server. Download and play uses the same protocols as normal web surfing: HTTP and FTP over standard TCP. When D+P is used, content may be hosted on standard web servers. The protocols and procedures needed to send D+P content to a viewer are the same as a simple HTML text delivery.

A big advantage of D+P is that it may work over any speed network connection. This is because there is no requirement for individual video packets to arrive at any specific time or in any specific order, since all of the content is delivered before playback begins.

Progressive Download and Play

Progressive Download and Play (PD+P) is a variation on D+P. It is used to simulate streaming for applications in which true streaming won't work properly, such as when true streaming behavior is blocked by a firewall. PD+P takes the video content file and breaks it up into smaller segments. When the user initiates a request to "stream" a video, each segment is consecutively downloaded to the player software. As soon as a segment is completely downloaded, the player may begin to process and display it while the next segment is being downloaded. As long as each new segment arrives before its time to play, the playback device will be able to create a smooth, unbroken video image.

Automatic Download and Play

Automatic Download and Play (AD+P) is a server-side and client-side system that automatically delivers an entire video file to an end-user's machine, and then notifies the end user (usually through a desktop icon change, or a system tray flag) that the entire video file has been delivered. The user then clicks on a user interface element (for example a thumbnail) to launch the video that was already fully downloaded to their hard drive prior to the new content notification.

Deficiencies with Streaming and Progressive Download and Play

Video may be encoded at a relatively high bit-rate in order to produce an image that is high resolution, high frame rate, and free of compression artifacts and other visual distortions that occur when encoded at a relatively low bit-rate. If the bit-rate at which the Output File is encoded significantly exceeds the data throughput to the end user's Internet connection (here referred to as "bandwidth" and measured in Mbps), then a smooth playback will require a large "buffer". Whether this "buffer" is a cache of data stored by the playback system (as sometimes involved in True Streaming), or the amount of time required for an initial PD+P segment to download, either way this is problematic as it delays the initiation of the playback experience for the end user. An additional problem arises if at some point during subsequent playback the "buffer" drops below a reserve that enables the video application to process input at a steady rate that is required for smooth playback. The video may then begin to look "jerky" because frames are being dropped, or the video may freeze at the last received frame as a result of the buffer being empty.

Anyone who has tried to watch a movie preview online has probably experienced problems with PD+P. One example scenario may be for a user to click a link on a website to request a video clip. The user may then see a video player displaying a message saying something along the lines of "Connecting to Media" or "Buffering" and perhaps a progress bar that represents the percentage of completion. Once the first segment was finally downloaded playback may begin. If the next segment completes its download prior to the first segment finishing, then playback will continue uninterrupted. However, if that next segment did not completely download in time, then the video viewing window may freeze, go blank, or begin to display the "Buffering" message once again.

Deficiencies with Automatic Download and Play

A large user base will have many different categories of users, as categorized by client bandwidth and the duration of their daily online activity. If a significant number of users are only online for a short daily duration, the server-side system may not be able to insure that all, or at least a very high percentage, of these users receive their content delivery that is scheduled for that day. This may occur due to limitations of delivery system resources. However, even if server-side delivery capacity is quite robust, data delivery may be compromised by poor conditions inherent to the client-side network environment. This problem is exacerbated by large video files; for example, a video file that is longer in duration and/or encoded at a higher bit rate.

Video Delivery Expedition (VDE)

Provided herein are methods, devices, systems and software providing an enhanced and superior data playback experience to a user. Referring to FIG. 1, shown is a high level view of the system architecture comprised of software components that reside in a Data Tier 100, a Middle Tier 120, and a Client Device 138. In some embodiments, the Data Tier 100 is comprised of a Server-side Database 102 and a Server-side File Storage 104. In certain embodiments, the Data Tier components reside in a data center or a cloud environment. Server-side Database 102 stores Bandwidth Metrics, Ad Metrics, Viewing Metrics, File Segment Information, Client Profile Data, and other relevant data for the server-side and client-side system. Client Device 138 is a device that hosts software applications. This is representative of numerous end-user devices, and these may include personal computers, mobile devices, and other types of devices that communicate with Middle Tier 120. The Middle Tier servers host web services and software components. Server-side File Storage 104 contains various segments of video files. An individual file segment is a portion of the full video experience that is ultimately viewed by the end user. Server-side File Storage 104 may also contain the entire raw files in their pre-segmented state.

Video file segments, in segmented form, are delivered to Client 138 via two processes:

Process One which in some embodiments involves a system-initiated delivery of an initial number of file segments that are automatically downloaded to Client Device 138 via a File Download Service 128. File Download Service 128 is a HTTP web service. The system performs multi-faceted analysis and executes robust processes in order to determine the precise timing of Process One, as well as the precise number of segments targeted to the specific user.

Process Two which in some embodiments is triggered by a user-initiated playback of the initial segment or segments that were previously downloaded via Process One. In certain situations, the segments delivered via Process Two are downloaded from a Cloud and/or CDN Partner 108; however, other delivery sources are also suitable may in alternative embodiments. Cloud may be defined as a virtualized server environment, which may be offered by companies like Microsoft, Google, or Amazon. The acronym CDN refers to Content Delivery Network and may refer to companies like Akamai, Limelight, and others.

Also provided is a Cloud and/or CDN Partner 108 that provides DRM security; however, other methods are also suitable.

Middle Tier

In some embodiments, a Middle Tier 120 hosts the server-side components that perform the business rules and a Data Access Component 112 that provides an interface to Data Tier 100. The Middle Tier components may reside in a Data Center or a Cloud environment. A Partner Service 114 is a HTTP web service that allows a Content Partner 130 (representing numerous external content partners) and an Advertising Partner 132 (representing numerous external advertising partners) to exchange data with the system.

Utilizing this web service, Content Partners and Advertisers may pass their targeting parameters and other business rules. Content Partners and Advertisers use the service to exchange data related to their video files, and may also use the service to transfer the actual video assets, and other media assets.

Also provided in various embodiments is a Raw Asset Processing Engine 126 residing in Middle Tier 120 which performs the operation of editing the whole video file into segments and compresses the output files that ultimately reside at Data Tier 100 and Cloud and/or CDN Partner 108. However, other methods for segmentation and compression of raw assets are also suitable, such as preparation in an environment external to the system. The segmented files will reside in Data Tier 100, or Cloud and/or CDN Partner 108, or the environment of other external partners (not shown), or any combination thereof. Server-side Database 102 stores the names of the data segments. The Raw Asset Processing Engine runs unattended. However, instead of running unattended an operator may use an "application user interface" to invoke the Raw Asset Processing Engine to perform the segmentation or the compression of the raw video file.

Further, in some embodiments provided is a Metrics Service 118 is a HTTP web service that implements interfaces that allow Client Device 138 to update and retrieve Metric Data to and from Server-side Database 102. Metric data includes File Segment Information, Content Metrics, Ad Metrics, Client Profile Data, Bandwidth Metrics, Session Data, Client Viewing Trends, and other relevant data and metrics. A Metric Data Manager 148 consumes the service.

In specific embodiments, an Anticipative Prioritization Analytical Engine 116 performs a multi-faceted analysis of present and historical data in order to predict the future behavior of the individual clients. The Analytical Engine then considers how the anticipated future state of an individual client impacts that client's present requirements. The Analytical Engine also considers how the anticipated future state of an individual client impacts the present requirements of other clients. The Analytical Engine also considers how the anticipated future state of an individual client impacts the system as a whole. The Analytical Engine also considers how anticipated future states of system conditions, such as traffic and load, impact individual clients and client subgroups. The Analytical Engine then coordinates the present time-frame allocation of system resources among the individual clients based on this predictive analysis. More detail is provided on the function of Anticipative Prioritization Analytical Engine 116 in the description for FIG. 2.

In further embodiments, provided is a File Manager Service 124 is a HTTP web service that implements interfaces that are used by a Download File Manager 146. In response to a request for new content, the File Manager Service 124 returns a collection of file names that identify segments of video files. Download File Manager 146 issues the request for new content.

Still further, in specific applications provided is a File Download Service 128 is a HTTP web service that implements interfaces to facilitate the background download of video file segments. This service is consumed by a Download Utility 142. A Download Service 11o is a HTTP web service that implements interfaces to facilitate the download of video file segments from the Cloud and/or CDN Partner. This service is consumed by Download Utility 142. A Segmented Video Data 106 represents the Cloud and/or CDN Partner storage. This is where segmented files reside to facilitate Process Two as described above.

Client Application

Figure 6:
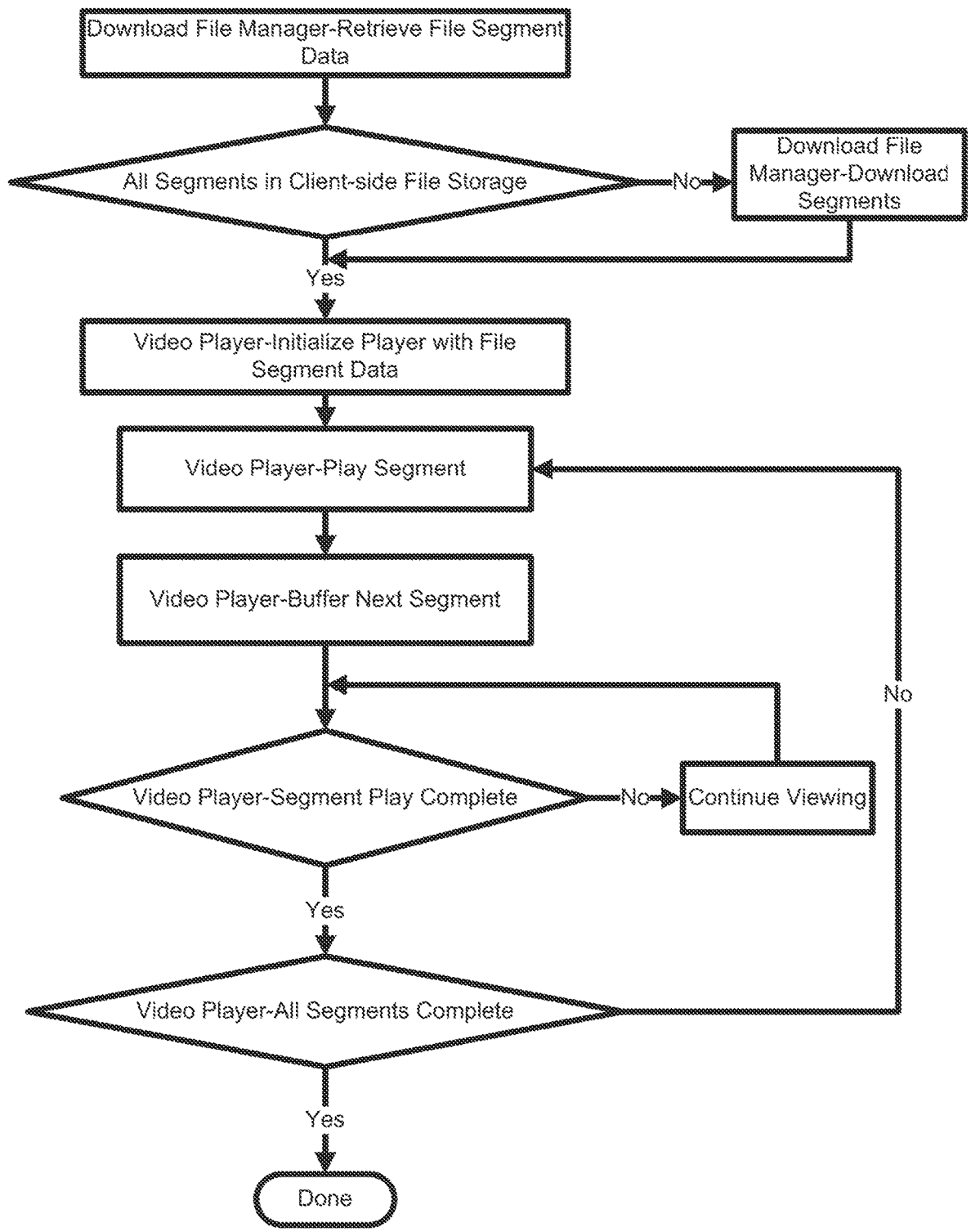
FIG. 6 is illustrative of the dataflow of one non-limiting embodiment depicting the process by which partially downloaded files or discreet files are viewed within embodiments of the VDE.

In some embodiments, the client application is comprised of five major elements which are hosted on Client Device 138: an Interactive Video Presentation Module 150, a Client Manager 162, a Client-side Database 158, a Client-side File Storage 168, and a Client Component Library 140. Further, in certain applications a Video Player 156 will play a collection of segmented files in a seamless fashion. Only an initial number of the file segments may be present in Client-side File Storage 168, which were previously automatically delivered via Process One described above. In that case, the balance of the file segments may be downloaded from Cloud and/or CDN Partner 108, or another source external to the client device. To ensure that the user enjoys a seamless video experience, Interactive Video Presentation Module 150 uses Download File Manager 146 to ensure that the balance of the required File Segments are downloaded from the Cloud and/or CDN Partner (or other source) in the background and buffered for viewing. FIG. 6 describes this process in more detail of this feature.

In addition to viewing videos, in further or additional embodiments, Interactive Video Presentation Module 150 will perform several administrative tasks. For example, the application will provide a convenient method to compress and save the current state of the client-side application. The compressed file may be subsequently loaded by the application on another machine. Saving the state of the application may be accomplished by saving Client-side File Storage 168 and Client-side Database 158. The application will also monitor and allow the user to remove files from their local storage, which may be done manually or automatically. Furthermore, in certain applications the Interactive Video Presentation Module 150 may also facilitate a peer-to-peer transfer of files to a user's additional device. The P2P functionality may also target specific files to specific users. All transfers may implement DRM and encryption schemes.

Figure 4:
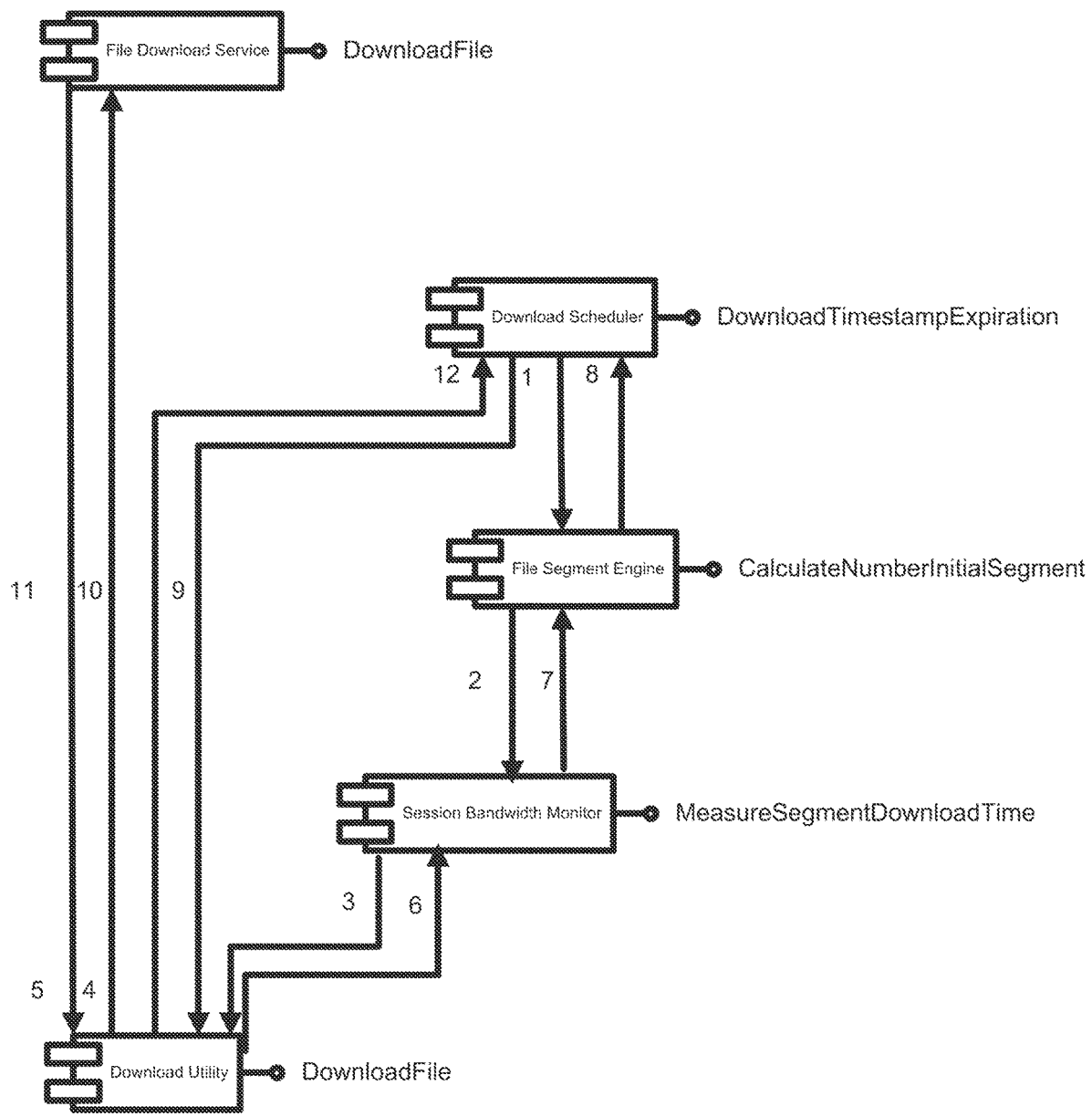
FIG. 4 is illustrative of a diagram showing one embodiment of the orchestration of the client and server components to facilitate the download of a file of one non-limiting embodiment of the VDE.

Still further, a Browser Display 152 communicates with an Ad Server 134 and an Ad Tracker 136. These may represent proprietary system servers, or servers operated by a 2nd or 3rd party. The Browser may display the ads while the Ad Tracker tracks the viewing. An Ad Viewing Metrics Reporter 154 will exchange Ad Viewing Metrics with participating Advertising Partner 132 via HTTP web service. This interface allows the partner to receive real time metrics and other data pertaining to content including, but not limited to, pre-roll, mid-roll, and post-roll as described in the section under FIG. 4 provided herein.

In some embodiments, An Interactive Video Presentation Module 150 also contains a Search Engine Component 151. This is described in more detail below. A Client Manager 162 is a background process that performs three key functions:

1. Schedule the background download of files
2. Background download the files
3. Notify user when new content is available In certain situations, the user is notified that new content is available via a Notification Manager 166. To perform the notification process, a Session Bandwidth Monitor 144 is used to acquire the user's current bandwidth and determine whether or not the user's bandwidth at the present time is sufficient to facilitate the downloading of the balance of segments via Process Two within the time frame provided by the playback of the segments that were previously automatically downloaded via Process One. If the conditions are suitable, then a new Notification is issued, enabling an environment in which Process Two may be executed. If conditions are not suitable, then the new Notification is withheld. If conditions are not suitable, the system may choose to wait for a future session in which better conditions are present. However, the system may alternatively choose to lessen the conditional requirements to effectively execute Process Two. This is accomplished by automatically initiating a further operation of Process One, thereby delivering additional segments in order to increase the critical time window to support Process Two. If the user is offline, all new Notifications associated with partially downloaded files are revoked. This process is further elaborated in FIG. 5.

Still further, a Download Scheduler 164 manages the user's download request events. Client Device 138 will check for new content at some time interval. The time interval may vary depending on the viewing frequency of the user or other factors. If a user becomes inactive, Download Scheduler 164 will not consume network resources to service the user.

In the event that new content is available, in certain situations the Client Device 138 will receive a background download timestamp to initiate the download; however, other methods are also suitable. If the client device has an Internet connection, Download Scheduler 164, via Download File Manager 146, will download files from File Download Service 128 or Download Service 11o at the scheduled time. If the user does not have an Internet connection at the scheduled time, a new download may be scheduled.

The Client Component Library 140 is comprised of the shared services that allow the two client applications, Interactive Video Presentation Module 150 and Client Manager 162, to communicate with Middle Tier 120 and Cloud and/or CDN Partner 108 to facilitate delivery of the segmented files. The Client Component Library is comprised of Metric Data Manager 148, Download File Manager 146, Session Bandwidth Monitor 144, Download Utility 142, and a File Segment Engine 143.

The Metric Data Manager 148 interfaces with Metrics Service 118 via HTTP. The Metric Data Manager transfers data to and from Client-side Database 158 to Data Tier 100 via Metrics Service 118.

The Download File Manager 146 uses File Manager Service 124 to retrieve the file names that correspond to the segmented video content files.

The Session Bandwidth Monitor 144 determines the bandwidth of the current session. After the bandwidth is collected the information is stored in Client-side Database 158.

The Download Utility 142 downloads file segments from Download Service 110 residing at Cloud and/or CDN Partner 108, or from File Download Service 128.

The File Segment Engine 143 uses data obtained by Session Bandwidth Monitor 144 in order to calculate the optimum number of segments to be proactively pulled down in an automatic, client-initiated download.

Search Functionality

Also described herein is a Search Engine Component 151, residing in Interactive Video Presentation Module 150, enables the user to state specific preferences or keyword queries regarding content they may like to experience via the system delivery process. Search Engine Component 151 may also automatically initiate retrieval of content based on its analysis of user interests and preferences. The Search Engine Component uses Download File Manager 146 to pass the search query to Client-side Database 158. The Download File Manager 146 retrieves the query from Client-side Database 158 and passes it, along with other data, to File Manager Service 124. The File Manager Service 124 passes the search queries to a Search Engine Module 122.

The Search Engine Module 122 in one embodiment resides in Middle Tier 120; however, it is also suitable for this module to reside in an external system. The Search Engine Module 122 interfaces with partners represented by Content Partner 130, and numerous other content providers (not shown) to achieve the best match for user requests. In addition to finding the optimal match corresponding to user preferences, the Search Engine Module also seeks to identify the optimum match regarding system quality standards and format requirements. Content providers may expose their interfaces to us to enable our system to execute any required DRM licensing agreements and retrieve and download the whole video file to our system. In certain situations, a Raw Asset Processing Engine 126 then segments and compresses the content and then passes it to Server-side File Storage 104 and Segmented Video Data 106, where it awaits delivery to the end user via the system delivery processes.

Figure 2:
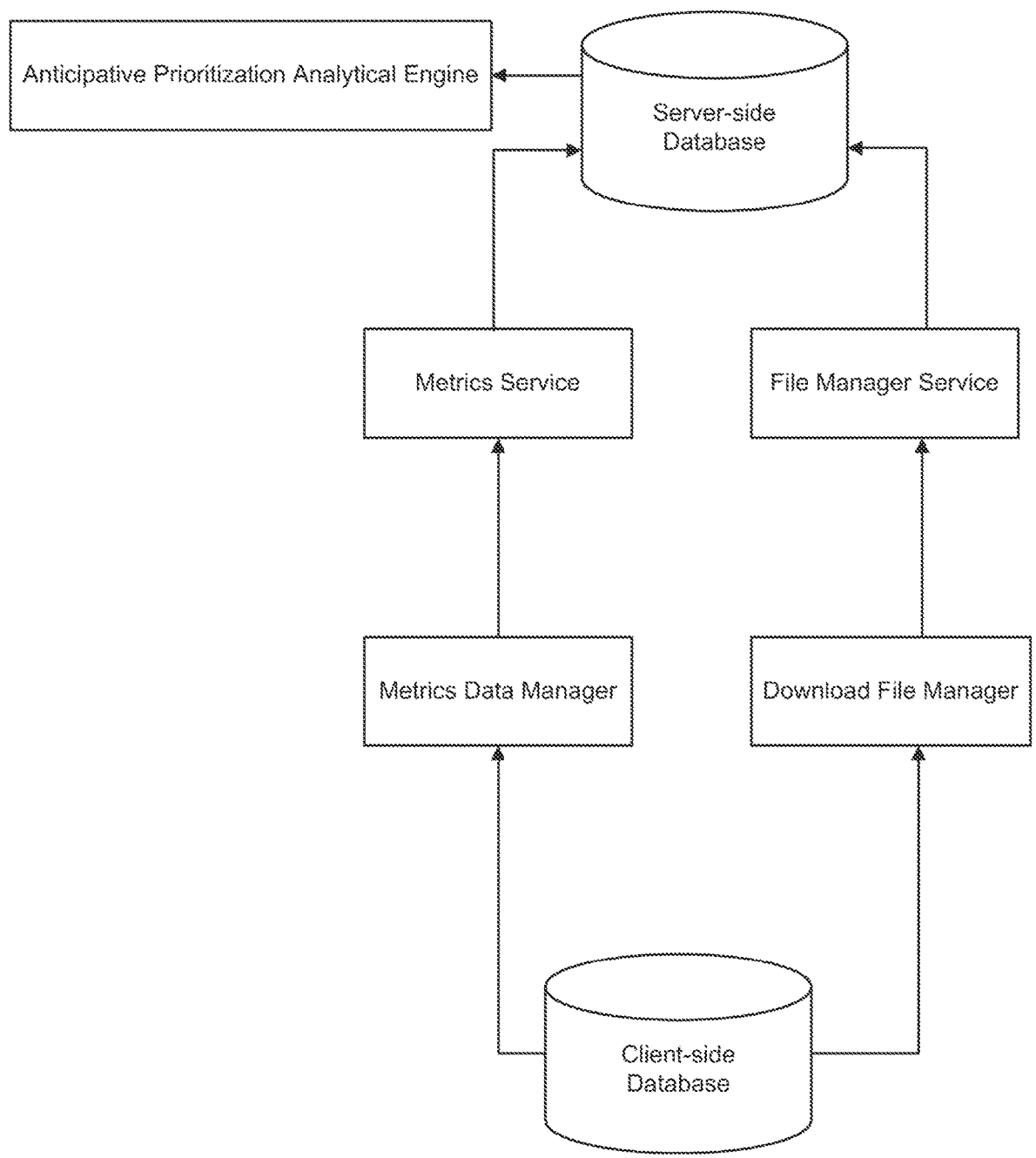
FIG. 2 is illustrative of one non-limiting embodiment depicting the delivery system that performs calculations based on client side viewing habits and client side bandwidth to schedule an optimum download time within embodiments of the VDE. The diagram shows one embodiment of how the data is passed from the client to the server.

FIG. 2: Anticipative Prioritization Analytical Engine

Turning now to FIG. 2, FIG. 2 illustrates a non-limiting process whereby data is transferred via Client-side and Middle Tier components to Server-side Database 102 (FIG. 1) and then consumed by Anticipative Prioritization Analytical Engine 116 (FIG. 1). The Analytical Engine utilizes this gathered historical data to construct a predictive model of individual client behavior and overall system behavior.

As introduced under FIG. 1, Process One segments comprising an initial portion of a whole video are automatically downloaded to Client Device 138. A "new content" notification is then issued to the user (see FIG. 5). Process Two is triggered when the notified user clicks to initiate playback of the Process One segments. During playback of Process One segments, Process Two segments download in the background and are queued to provide a seamless presentation of the whole video.

Client-Side Database 158 (FIG. 1) stores various client-side metrics including a historical profile of the user's bandwidth, the time period between Process One download of content and user-initiated viewing of that content, the historical profile of online session duration, content interaction, and other relevant client-side data. To minimize network traffic, Server-side Database 102 is updated at a specified time interval; however, other methods are also suitable. Metric Data Manager 148 retrieves the data from Client-side Database 158 and passes the data to Metrics Service 118. The Metrics Service then stores the data in Server-side Database 102. Download File Manager 146 calls File Manager Service 124 to update Server-side Database 102 with information related to the user's video file library.

The Anticipative Prioritization Analytical Engine 116 (FIG. 1) performs a multi-faceted analysis of present and historical data in order to predict the future behavior of the individual clients. The Analytical Engine then considers how the anticipated future state of an individual client impacts that client's present requirements. The Analytical Engine also considers how the anticipated future state of an individual client impacts the present requirements of other clients. The Analytical Engine also considers how the anticipated future state of an individual client impacts the system as a whole. The Analytical Engine then coordinates the present allocation of system resources among the individual clients based on this analysis.

The Analytical Engine predicts the probable future behavior of individual clients, and based on this anticipation of their future state determines which clients require less attention at the present time. For example, the Analytical Engine may choose to redirect system resources away from users that it anticipates will maintain a longer session duration on this particular day, or portion of this day, based on an analysis of their historical profile data. The Analytical Engine may also choose to direct resources away from users that are presently known to have greater bandwidth availability, or based on historical data are predicted to have greater bandwidth at an impending time frame. The users that are predicted to stay online longer, or are predicted to have relatively greater bandwidth during an impending time frame, may not be deemed to be as urgent a priority for the Process One system-initiated downloads, and other targeted data. The Analytical Engine may choose to redirect system resources away from those users and direct them toward the users that are predicted to disconnect sooner, or presently have low bandwidth, or are predicted to enter an impending time frame during which they will have relatively low bandwidth.

The Analytical Engine also determines which clients require more attention at the present time based on the predictive anticipation of their impending future state. This may include users that the Analytical Engine predicts will have a shorter session during this particular day, or portion of this day, based on their historical profile data. This is important due to the fact that users who are anticipated to disconnect sooner may not receive all of the data required to fulfill Process One unless they are prioritized. Another example may include users that presently have low bandwidth, or are predicted to have limited bandwidth availability during an impending future time frame. In general, users that consistently have low bandwidth may require a Process One delivery comprised of a greater number of data segments. This is further compounded by the fact that the time required to download those segments will also be greater. Having performed a contextual analysis of all users presently connected, the Analytical Engine may choose to direct greater system resources to particular subgroups including, but not limited to, the examples above. Varying degrees of greater or lesser resource allocation that is targeted on a very granular level may also be deemed advantageous.

The Analytical Engine also anticipates future Server-side conditions and traffic patterns based on its analysis of historical data, and may factor this into its present decision-making. Therefore, the Analytical Engine may choose to withhold "new content" notifications from a sub-group of the user base in order to reserve network resources for an anticipated traffic spike or other future system needs. Signaling the availability of new content to users creates a condition that will tax future system resources because interaction with new content requires the missing file segments to be downloaded to the user via Process Two, which may be highly intensive for server-side bandwidth and processing resources.

Furthermore, the Analytical Engine utilizes the user-base historical profile data to determine which users are more likely to expeditiously initiate a playback of newly designated available content. Therefore, the system does not merely withhold new content notification from a number of users simply based on their representative percentage of the entire user base or an estimation of their data requirement. Rather, the system determines for which users the delay will be more impactful or appropriate, and in a sense "targets the withholding" of new content notifications from members of the user base on a granular level balancing system requirements and user experience.

In addition to intelligently managing the Process Two user-triggered background downloads via the mechanism of withholding new content notifications, the Analytical Engine also intelligently manages the Process One system-initiated downloads. The Analytical Engine continually adjusts the scheduling of system-initiated downloads on the fly as it receives new data on present server-side and client-side conditions and analyzes its relevance in context with the predictive calculations regarding client-side and server-side impending states. Further, the Analytical Engine considers the impact of these scheduling decisions upon the future behavior of impending server-side conditions that it anticipates based on its analysis of historical data. The Analytical Engine also considers the impact of its scheduling decisions upon the needs of individual clients, based on an understanding of their present needs and future needs as they are defined in the context of the anticipated future state of those clients.

In certain embodiments, the method of scheduling downloads may involve the server issuing a time stamp to the client; however, other methods are also suitable. When the time stamp on the client expires, the client is permitted to perform the system-initiated background download. An alternative embodiment may include, but is not limited to, a "call-back" in which the server calls the client when a time stamp on the server expires. Another alternative embodiment may include, but is not limited to, a "push" in which the server pushes data down to the client as opposed to the client pulling data from the server. In addition to these, other methods may also be suitable.

Figure 3:
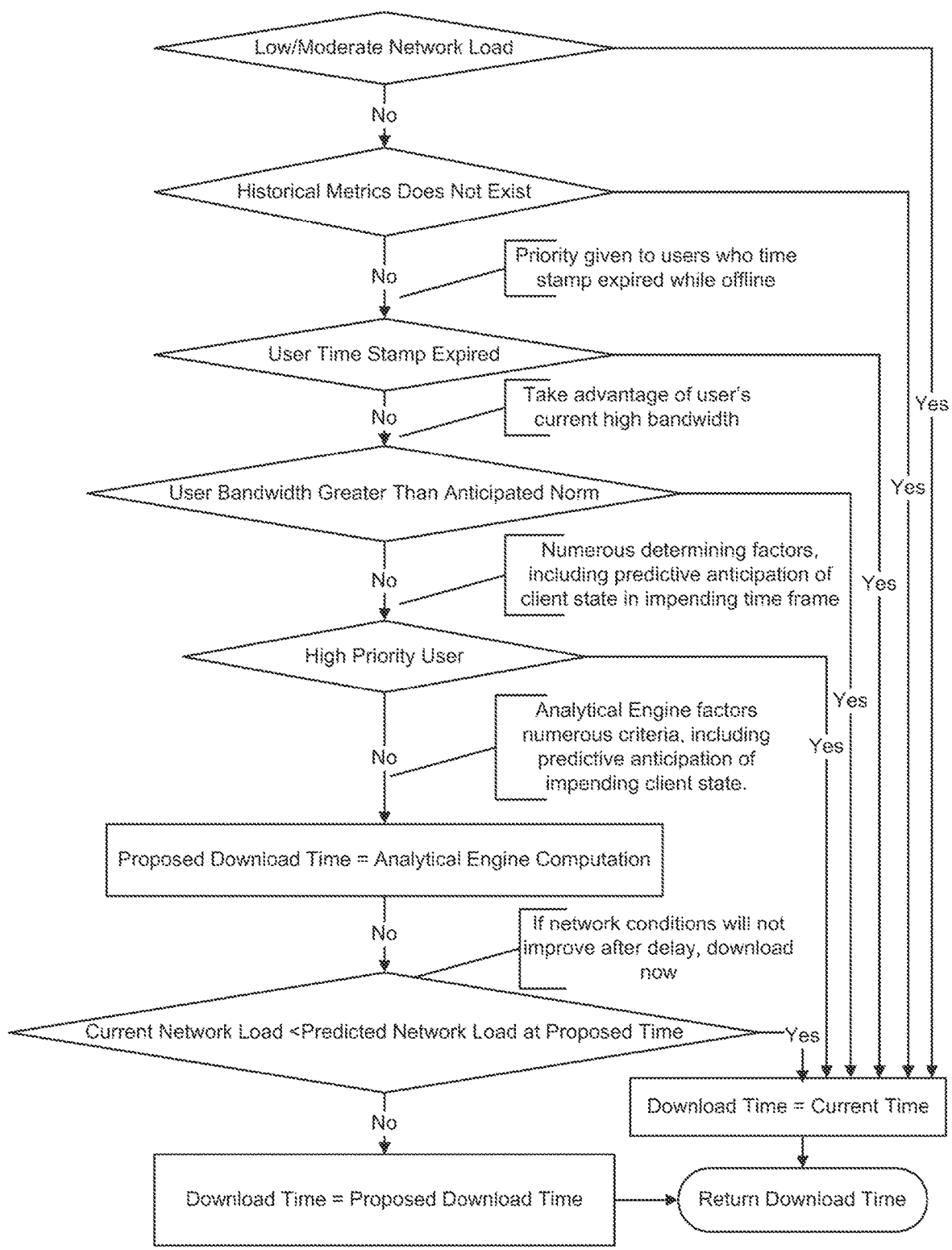
FIG. 3 is illustrative of one non-limiting embodiment depicting the delivery system does not allow clients to dictate the download traffic. The server side logic schedules the download of files within embodiments of the VDE. The flowchart shows one embodiment of the dataflow on the server side required to calculate a scheduled download time.

FIG. 3: Prioritization and Scheduling of Process One

FIG. 3 shows a process whereby the Anticipative Prioritization Analytical Engine 116 (FIG. 1) calculates and schedules the user's background download time for Process One. To schedule the background download the Analytical Engine performs a multi-faceted analysis of current and historical client-side and server-side conditions, combined with computations involving predictive analysis that anticipates the impending state of individual clients, client subgroups, and server-side and network conditions. This facilitates the purpose of coordinating and targeting data and resources on a granular level in order to optimize system efficiency and effectiveness, and to provide an optimum end-user experience.

As shown in the drawing, when there is low to moderate network traffic, the Anticipative Prioritization Analytical Engine allows all clients to download files immediately. If the network traffic is high, the Anticipative Prioritization Analytical Engine will check the Server-side database for metric data.

If metric data does not exist, the Anticipative Prioritization Analytical Engine allows the client to download files immediately. If metric data does exist, the data is used to formulate a proposed download time. However, if Client Device 138 making the request was not able to download files at a previously generated download time (for example, because the client device disconnected from the Internet), the client will be allowed to download files immediately.

Priority is also given to users who currently have bandwidth that is relatively high compared to their anticipated norm, or users that are designated as prioritized. A user's priority is established by the Anticipative Prioritization Analytical Engine based on numerous and multi-faceted analysis and computations. Some of the criteria for this decision-making are detailed in the description above pertaining to FIG. 2. One prioritization factor involves a determination of the client's needs in the present time frame that is established within the context of the anticipated future state of the client during an impending time frame. One of the key functions of the Anticipative Prioritization Analytical Engine involves a predictive analysis of the client's future state as a factor governing support decisions directed toward the client during the present time frame.

Finally, the Anticipative Prioritization Analytical Engine calculates a proposed download time. The decision regarding the download window factors a predictive analysis that anticipates the client-side status and network conditions of the individual client during an impending time frame. The decision also involves the optimum coordination of data targeting and allocation of system resources. This may also involve a predictive analysis that anticipates impending future client states. However, this decision level focuses on a contextualized view of the impending future state of the whole user base, or user-base subgroups. The Analytical Engine also performs calculations that predict the network load and other system factors during the impending time frame of the proposed download window. The Analytical Engine also considers business rules.

If at some point prior to the proposed download the system or network conditions are more favorable than anticipated, the Analytical Engine will assess the advantage and may take the opportunity to permit the client to download data ahead of schedule. Otherwise, the proposed download time is used as originally calculated.

FIG. 4: Component Interaction and Calculation for Process One

Turning now to FIG. 4, FIG. 4 shows how the server-side and client-side components interact to calculate the optimum number of segments for the initial automatic download process. These are the initial segments of the whole video that are delivered via Process One described under FIG. 1. Process One is an automatic system-initiated segment delivery process that precedes the "New Content" notification to the user (described in FIG. 5) that in turn precedes the user-initiated playback process that in turn triggers the download of the balance of the file segment data comprising the whole video (Process Two).

Download Scheduler 164 (FIG. 1) initiates the automatic process of downloading new segment data. This occurs when a time stamp expires that was issued by Anticipative Prioritization Analytical Engine 116 (FIG. 1). However, other methods are also suitable such as a server-side triggered or client-side triggered command to Download Scheduler 164 to immediately execute. Download Scheduler 164 (FIG. 1) via Client-side Database 158 (FIG. 1) retrieves the file metrics for each of the files that are to be downloaded. Alternatively, file metrics may be retrieved from the Server-side of the architecture or a source external to Client Device 138. Associated with each segmented filename stored in the database are certain attributes that make up the file metric data. The attributes may include, but are not limited to, the following:

- Encoded bit-rate in Mbps
- Frame Size
- Frame Rate
- Number of Frames
- Playback Time (Duration in Seconds)
- Unique File Identifier
- Number of file segments that comprise the whole video
- Collection of filenames that represent the individual segments that make up the total file After the file metric data is retrieved, the file metric data is passed to File Segment Engine 143 (FIG. 1) for processing. In certain embodiments, File Segment Engine 143 (FIG. 1) uses data obtained by Session Bandwidth Monitor 144 in order to determine bandwidth; however, other methods are also suitable. The Session Bandwidth Monitor obtains this data by downloading an initial file segment (or segments) from Server-side File Storage 104 or Segmented Video Data 106, or another external source, using File Download Service 128 or Download Service 110, and Download Utility 142. All file downloads are stored in Client-side File Storage 142. To determine the current bandwidth, Session Bandwidth Monitor 144 stores the amount of time that was required to download the file that is associated with the first filename in the file segment collection. However, other methods are also suitable, such as calculating the average time required to download an initial set of sequential segments.

In some embodiments, a formula is utilized as a method for File Segment Engine 143 (FIG. 1) to calculate the optimum number of segments to be proactively pulled down for the Process One automatic, client-initiated download; however, other formulas and methods may also be suitable. The Download Time value of the first file segment (or segments), and the Playback Time (duration) of the first segment(s), are used in the formula. The Playback Time may be determined by gathering duration metadata associated with the file. However, other methods are also suitable.

In certain situations, a minimum of 20% of the Total Segments will be downloaded to the user; however, a greater or lesser default minimum is also suitable. In the event that the Playback Time is greater than the Download Time, the default minimum of 20% of the Total Segments will be sufficed. However, if the Download Time exceeds the Playback Time, then more segments will be needed. The Additional Segments are calculated as follows; however, other methods are also suitable [note: final fraction is rounded up to the integer]:

Ratio=Playback Time/Download Time

Default Segments=(0.20*Total Segments)+1

Remaining Segments=Total Segments−Default Segments

Additional Segments=Remaining Segments−(Ratio*Remaining Segments)

Total Downloaded Segments=Default Segments+Additional Segments

Given the following parameters: Play Back Time of 10 seconds, Download Time of 20 seconds, 20 Total Segments, and a Default Download of 20%; the formula may calculate that 13 segments need to be downloaded. After the File Segment Engine calculates the number of file segments to download, Download Scheduler 164 downloads the file segments via Download Utility 142 (FIG. 1).

Additional Processes

There are several important supplemental processes that relate to FIG. 4, but are not specifically depicted by FIG. 4. These are designated as Pre-roll Processes, Mid-roll Processes, and Post-roll Processes.

Pre-Roll Processes

Pre-roll video is a separate video piece that precedes the main content. It may include, but is not limited to, advertising content.

Pre-Roll Process A

In this process a pre-roll piece was added to the beginning of the main content prior to or during the segmentation process performed by Raw Asset Processing Engine 126 (FIG. 1). Therefore, the formula used by File Segment Engine 143 to calculate the optimum number of segments for Process One remains the same. From the perspective of the client-side application, the pre-roll is recognized as part of the whole video. It is a portion of the "Total Segments" facet of the formula.

Pre-Roll Process B

In this process a pre-roll is streamed or delivered from a source external to Client Device 138 (FIG. 1), a process that is triggered when the user clicks to initiate a playback of the main content. For example, the pre-roll may reside on the network of Ad Server 134 (FIG. 1), or at another external location. Although from the perspective of the end user the pre-roll is displayed prior to the main content, in reality the initial segments of the main content were actually delivered prior to the delivery of the pre-roll as per the system-initiated background-download Process One described above.

Pre-Roll Process C

In this process a pre-roll is pulled from Client-side File Storage 168 (FIG. 1), where it was automatically downloaded at some prior time from either Cloud and/or CDN Partner 108, or from Data Tier 100, or from Content Partner 130, or from Advertising Partner 132, or from Ad Server 134, or from another external source.

In Pre-roll Process C the duration of the pre-roll video residing in Client-side File Storage 168 (FIG. 1) may be factored in the Process One calculation performed by File Segment Engine 143, thereby reducing the required number of main-content segments that may be automatically downloaded prior to issuing a new-content notification. When the user initiates playback, the pre-roll video is pulled from Client-side File Storage 168 and is queued in front of all subsequent segments that are sequentially played back by Video Player 156 (FIG. 1).

Another process pertaining to Pre-roll Process C involves selection decisions to identify the optimum pre-roll video that will be pulled. At any given time there may be several pre-roll videos residing in Client-side File Storage 168.

One selection criterion involves business rules that correlate to the various pre-roll videos. These business rules reside in Client-side Database 158. These rules may originate from Data Tier 100, or Middle Tier 120, or Content Partner 130, or Advertising Partner 132, or Ad Server 134, or any external source, or any combination thereof. These rules may include, but are not limited to the following:

Advertising Partner targeting and delivery rules (e.g., optimum date/time when ads are delivered, a sequence in which ads are delivered, the type of main content or brand association that will follow their pre-roll, and other preferences)

Content Partner preferences or restrictions regarding the type, brand, or value of the pre-roll that will precede their content.

Another criterion correlating to the selection process is the duration of the pre-roll. File Segment Engine 143 identifies the critical time window provided by Process One, and utilizes this as a factor governing its selection criterion of an appropriate pre-roll (as defined by the duration of the pre-roll) that it retrieves from Client-side File Storage 168. For example, File Segment Engine 143 may retrieve a 30-second pre-roll to augment the Process One window if it calculates that a 10-second pre-roll may not provide a sufficient augmentation to facilitate the download of the Process Two segments within the necessary time frame to ensure their seamless playback.

There may also be instances when the duration of a pre-roll residing in Client-side File Storage 168 sufficiently supplements the sequential download time required by all segments comprising a whole video. The client-side application may therefore initiate a "new content" notification, signaling content availability, without initiating Process One.

Mid-Roll Processes

Similar to Pre-roll, Mid-roll video is a separate video piece distinct from the main content. This may include advertising content, however, other types of content are also suitable. As the name implies, Mid-roll is displayed during a mid-duration point of the main content (i.e., anytime between the beginning and end of the main content playback). There are three types of Mid-roll Processes.

Mid-Roll Process A

In this process the mid-roll piece was added to the main content prior to or during the segmentation process performed by Raw Asset Processing Engine 126 (FIG. 1). Therefore, the formula to calculate the optimum number of segments for Process One remains the same. From the perspective of the client-side application, the mid-roll piece is recognized as part of the whole video. It is a portion of the "Total Segments" facet of the formula.

Mid-Roll Process B

In this process the mid-roll is streamed or delivered from a source external to Client Device 138 (e.g., Ad Server 134, or any other external source), a process that is triggered at some point after the user clicks to initiate playback of the Process One segments that were previously downloaded prior to the user receiving a notification informing her of available content. From the perspective of the end user, the mid-roll is displayed in a time frame that is at a mid-point of the duration of the main content. However, in reality, segments of the main content displayed after the mid-roll may have actually been delivered prior to the delivery of the mid-roll as per the system-initiated background download process described above.

If the duration of the mid-roll is known in advance, then File Segment Engine 143 factors this data and adjusts the formula utilized to calculate the required number of segments for the initial automatic background download process that constitutes Process One. This is because the download of the Mid-roll will be competing for end-user bandwidth against the download of the "Process Two" balance of the main content segments that may be facilitated during the time frame provided by the playback of the Process One segments.

As introduced under FIG. 1 and detailed in FIG. 4, the Process One segments that are auto-downloaded prior to a "new content" notification serve the purpose of providing a playback duration that provides a time frame in which the subsequent balance of the main-content segments may be delivered via Process Two. Delivering a mid-roll will compete for bandwidth; and if download time will exceed playback time, it will reduce the critical time window provided by Process One. Therefore, File Segment Engine 143 may identify the window provided by Process One, and utilize this as a factor governing its selection criterion of an appropriate mid-roll (as defined by the duration of the mid-roll) that it authorizes for targeting to Client Device 138. In other words, it may determine that a 10-second mid-roll qualifies, whereas a 30-second mid-roll does not.

Mid-Roll Process C

In this process the Mid-roll is pulled from Client-side File Storage 168 (FIG. 1), to which it was automatically downloaded at some prior time from either Cloud and/or CDN Partner 108, or from Data Tier 100, or from Content Partner 130, or from Advertising Partner 132, or from Ad Server 134, or from another external source.

In Mid-roll Process C the duration of the mid-roll video residing in Client-side File Storage 168 (FIG. 1) is factored in the calculation performed by File Segment Engine 143, thereby reducing the required number of main-content segments that may be automatically downloaded prior to issuing a new-content notification. During the playback of the Process One main-content segments a process is triggered in which the mid-roll video is pulled from Client-side File Storage 168 and is queued into a proper sequence for playback by Video Player 156. Alternatively, the mid-roll may be pulled from file storage during playback of Process Two segments and queued into the Process Two segment sequence (which may occur prior to full Process Two delivery).

Alternative to a pre-determined process, a mid-roll piece may be pulled on the fly from Client-side File Storage 168. One reason for performing this on the fly may be a determination by File Segment Engine 143 that end-user bandwidth has unexpectedly diminished and the previously downloaded Process One segments no longer provide a sufficient playback window to facilitate the time required for all Process Two segments to download. This on-the-fly process of pulling a mid-roll piece from Client-side File Storage 168 may also be used in conjunction with other methods of main content delivery (e.g., True Streaming, Scalable Video Streams, Progressive Download and Play, etc.) in order to compensate for various delivery issues (for example, insufficient packet delivery rate).

Another process pertaining to Mid-roll Process C involves selection decisions to identify the optimum mid-roll video that will be pulled. At any given time there may be several mid-roll videos residing in Client-side File Storage 168.

One selection criterion involves unique business rules that correlate to the various mid-roll videos. These business rules reside in Client-side Database 158. These rules may originate from Data Tier 100, or Middle Tier 120, or Content Partner 130, or Advertising Partner 132, or Ad Server 134, or any external source, or any combination thereof. These rules may include, but are not limited to the following:

- Advertising Partner targeting and delivery rules (e.g., optimum date/time when ads are delivered, a sequence in which ads are delivered, the type of main content or brand association that the mid-roll will be integrated with, and other preferences)
- Content Partner preferences or restrictions regarding the type, brand, or value of the mid-roll that will be associated with their content.

Another criterion correlating to the selection process is the duration of the mid-roll. File Segment Engine 143 identifies the critical time window provided by Process One, and utilizes this as a factor governing its selection criterion of an appropriate mid-roll (as defined by the duration of the mid-roll) that it retrieves from Client-side File Storage 168. For example, File Segment Engine 143 may retrieve a 30-second mid-roll to augment the Process One window if it calculates that a 10-second mid-roll may not provide a sufficient augmentation to facilitate the download of the Process Two segments within the necessary time frame to ensure their seamless playback.

Post-Roll Processes

Similar to Pre-roll and Mid-roll, Post-roll video is a separate video piece distinct from the main content. This may include advertising content, however, other types of content are also suitable. Post-roll is a video piece that follows the main content. Many of the processes for Pre-roll and Mid-roll that are described above are also relevant for Post-roll. In order to avoid superfluous repetition, it should be sufficient to state that any number or combination of the above described processes can, if relevant, be applied to Post-roll video.

Figure 5:
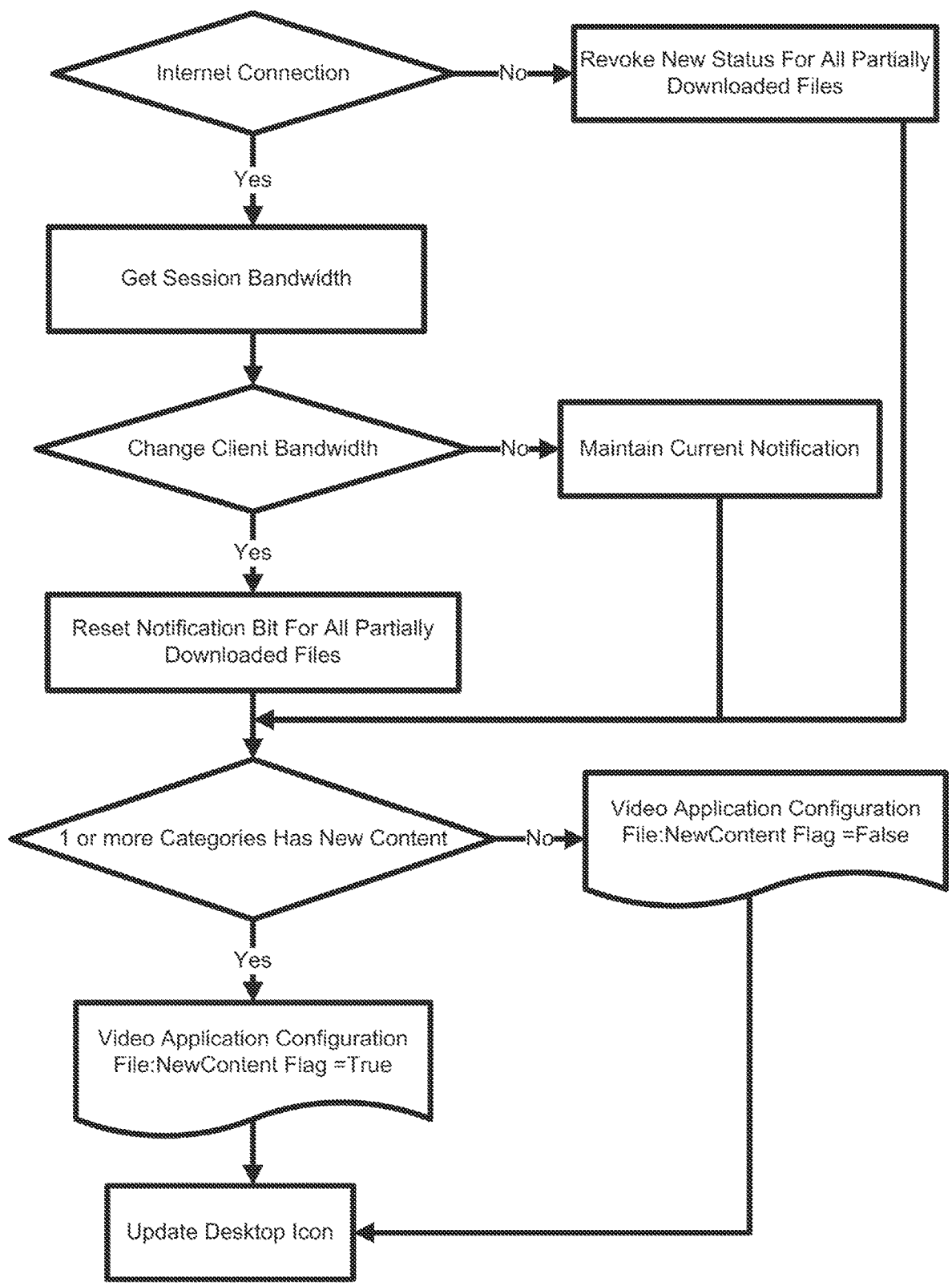
FIG. 5 is illustrative of the dataflow depicting one non-limiting embodiment of the process by which the user receives a notification that a partially downloaded file is ready for viewing within embodiments of the VDE.

FIG. 5: Notification Management

Turning now to FIG. 5, FIG. 5 shows the process by which Notification Manager 166 (FIG. 1) revokes or maintains a notification that alerts the user regarding the availability of new content.

In the present embodiment the notification includes a graphic displayed on the desktop, such as a desktop icon. However, other methods of notification, such as a system tray alert, an audio alert, or any other type of graphic or media that are displayed on Client Device 138 (FIG. 1), are also suitable; either individually or in combination. Additionally, audio or visual notifications that are emitted or displayed by any peripherals connected to Client Device 138 via cable or wireless or remotely via an Internet connection are also suitable.

In the event that Client Device 138 does not have an Internet connection, the notification may be revoked for all partially downloaded files. However, if the user does have an Internet connection, then the current bandwidth may be obtained from Session Bandwidth Monitor 144 (FIG. 1) because the client's bandwidth may have changed since the notification was issued. If the bandwidth has not changed, the current setting will be maintained. However, if the bandwidth has changed, the new-content flag may be reset.

The process for resetting the flag is as follows. If the time currently required to download a file segment is greater than the download time that was originally used to calculate the optimum number of pre-downloaded file segments by a factor that exceeds the safety net provided by the initial default segments (as explained in the description for FIG. 4), the new-content notification may be revoked.

A new-content notification for the application appears whenever new content is designated as being available. The process will check all categories for new content. Video content is organized within video categories in certain embodiments; however, other types of content and other methods of content organization are also suitable. If new content is available, the new-content flag is set.

It should also be mentioned that just because the availability of new content may be facilitated by the system at a given point in time, this does not necessitate that a new-content notification may be issued during that time frame. According to business rules, there may be instances when the availability of content will be restricted or postponed. Therefore, the system may perform a business-rule check before triggering the notification.

In certain situations, the Interactive Video Presentation Module 150 (FIG. 1) will display the new-content notification when the new-content flag is set to true. However, it is also suitable for other components on Client Device 138 to display the new-content notification. Additionally, it is also suitable for devices connected to Client Device 138, either directly or remotely, to display the new-content notification.

On a user interface level, in certain embodiments categories containing newly available video content will provide a visual indication that new content is available in that category. Further, navigating within a category will provide additional visual indicators that are more specific and descriptive regarding the nature of the content that is available. For example, "thumbnail" images and animations may signal newly available video content. However, other types of available content, and other methods of organizing and displaying visual indicators are also suitable.

FIG. 6: Process Two Component Interaction and Video Playback

FIG. 6 shows the process whereby Video Player 156 (FIG. 1) plays file segments. To play a video file, Download File Manager 146 (FIG. 1) checks to see if all file segments that comprise a whole video are presently available in Client-side File Storage 168 (FIG. 1). Oftentimes only the initial set of the sequential file segments are present in Client-side File Storage 168, which were downloaded during a prior time frame or prior session via the automatic process described in FIG. 4.

If a portion of sequential file segments comprising the whole video is not present in Client-side File Storage 168, which in fact is often the intended scenario orchestrated by the system, then Download File Manager 146 starts downloading the missing files in the background via Download Utility 142 (FIG. 1). Download Utility 142, based on business rules that were previously established, will call either File Download Service 128 (FIG. 1) or Download Service no (FIG. 1) to retrieve the file segments that were not available in Client-side File Storage 168, and downloads them to Client-side File Storage 168.

Download File Manager 146 (FIG. 1) retrieves the collection of filenames that represent the whole video from Client-side Database 158 and passes it to Video Player 156. Video Player 156 receives the collection of filenames from Download File Manager 146 and begins the process of playing the sequential file segments, which it retrieves from Client-side File Storage 168. While one file segment is playing, another file segment is buffered. Video Player 156 continues to play one file, while buffering the next file in the file segment collection, until all file segments comprising the whole video have completed their sequential playback in a seamless fashion.

Figure 7:
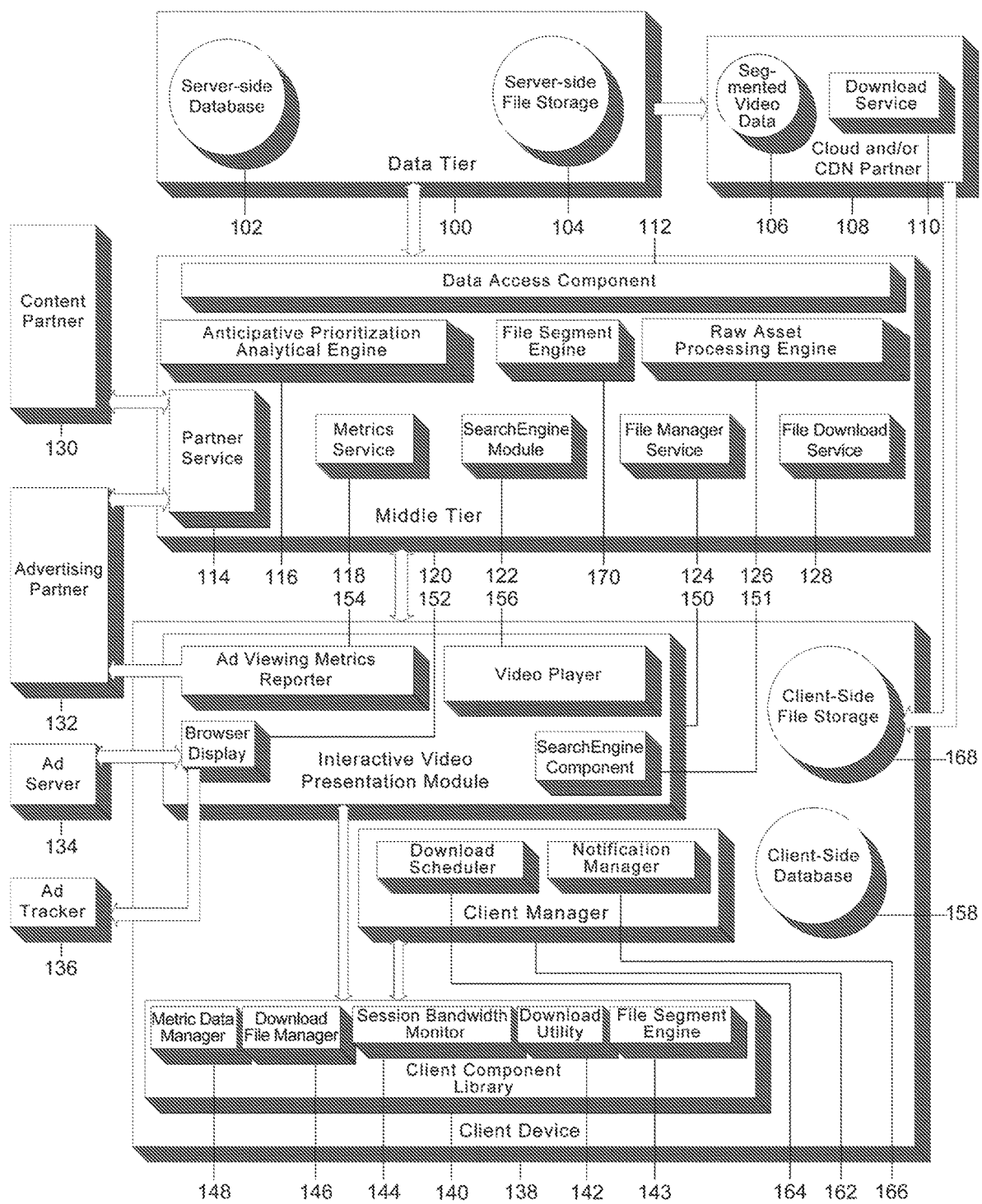
FIG. 7 is illustrative of an alternative non-limiting embodiment showing the File Segment Engine 170 which resides on the server side within embodiments of the VDE. In this embodiment, the server may determine the number of segments that are downloaded to the client. The session bandwidth data required to calculate the file segments may be derived from the current or historical bandwidth of the client. The historical data and current data are transferred to the server via the Metric Service 118 within embodiments of the VDE.
Figure 8:
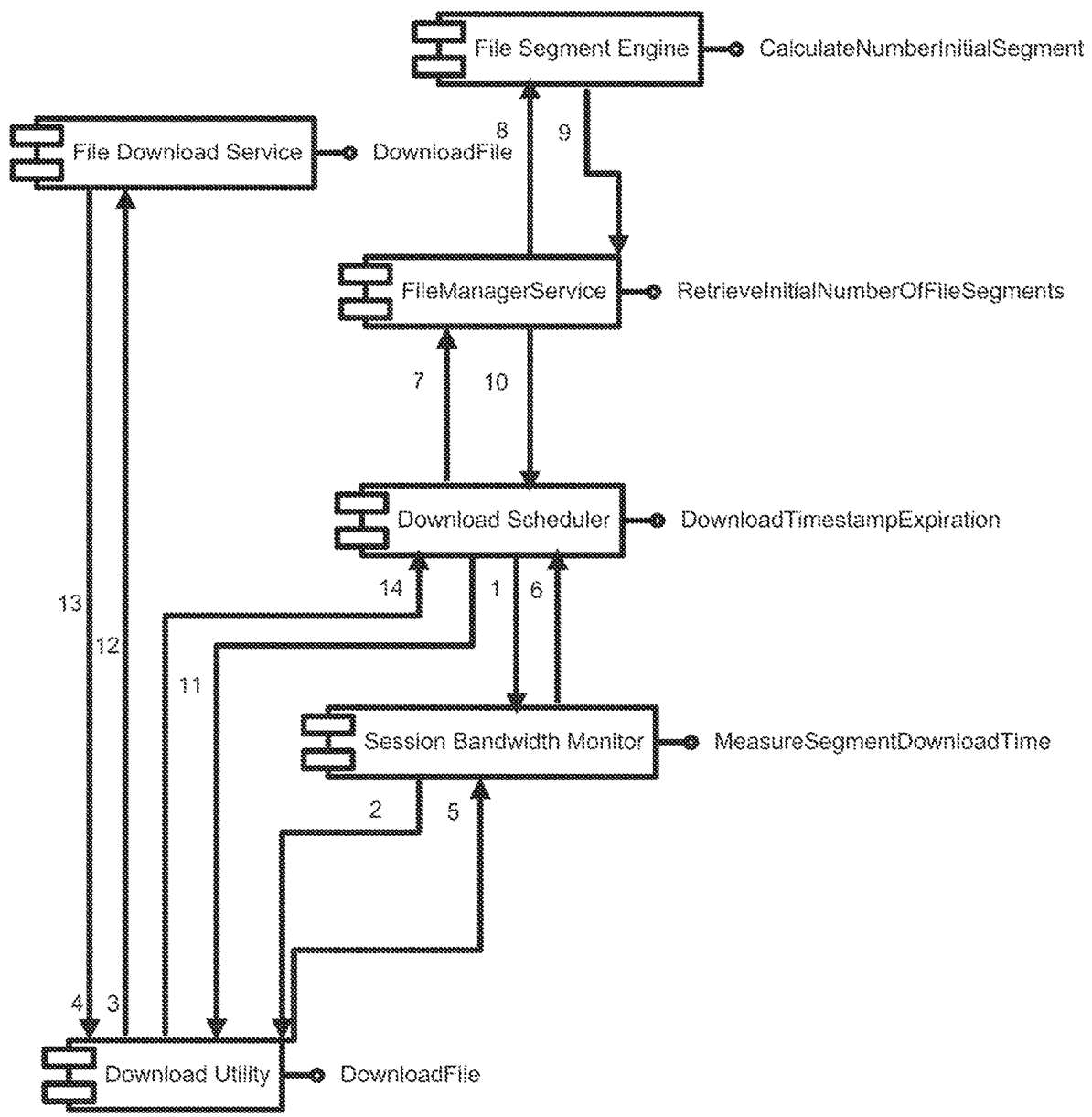
FIG. 8 is illustrative of the orchestration of one non-limiting embodiment depicting the client and server components that facilitate the download of a file in the alternative embodiment of the VDE.

Alternative Embodiment: FIG. 7 and FIG. 8

FIG. 7 is identical to FIG. 1, with the exception that a File Segment Engine is present within Middle Tier 120.

FIG. 8 shows an alternative embodiment, namely, how the server-side and client-side components interact to calculate and deliver the optimum number of segments for the initial automatic download process. In this alternative embodiment File Segment Engine 170 is located in Middle Tier 120 (FIG. 7).

After the download time of the first segment or set of initial segments is obtained, Download File Manager 146 (FIG. 7) via File Manager Service 124 (FIG. 7) passes the file metrics and the user's bandwidth represented by the file download time to File Segment Engine 170 (FIG. 7) residing in Middle Tier 120 (FIG. 7). It may also be suitable for File Segment Engine 170 to obtain relevant data from Server-side Database 102 (FIG. 7).

After File Segment Engine 170 (FIG. 7) residing in Middle Tier 120 calculates the optimum number of file segments for automatic download, the results are returned to Client Device 138 via Download File Manager 146. After this process Download Scheduler 164 downloads the file segments via Download Utility 142.

Additional Alternative Embodiments

In one embodiment, data is automatically downloaded that represents a portion of the entire playback file that is ultimately viewed by the end-user. However, the data delivered via Process A may not necessarily be a discreet or self-contained video file segment. In other words, the Process A data may be combined with additional data; otherwise, the Process A data by itself may lack effectual value.

At some point in time after the user's device receives automatic delivery of the Process A data, the user is allowed to initiate a playback event that triggers a subsequent Process B. Notification processes may precede the user-initiated event that triggers Process B. The notification process may be similar to the process described in FIG. 5; however, other methods are also suitable.

Process B involves a request that is sent over IP (Internet Protocol) to a server that begins downloading the missing balance of data. The Client-side Application receives the Process B data delivery that was triggered by the user-initiated event. This data is then merged with the data that was previously automatically downloaded via Process A. The newly delivered data may be merged via a process that only involves temporary caching of the data. Alternatively, the newly delivered data may be permanently saved to disk and then read from disk by the Client-side Application.

In another embodiment, the Process A data by itself may be of effectual value; for example, allowing the user to be able to preview content prior to the subsequent Process B download. In one variation, the Process B download may automatically initiate as the result of a user-initiated trigger event; for example, the playback of content delivered via Process A. Alternatively, Process B may require a direct authorization event from the user in order to execute.

In yet another embodiment, the Process A data delivery may be triggered by a user-initiated event. In still a further embodiment, all of the various methods and processes described herein may be utilized, with the following additions. This embodiment is identical to Alternative Embodiments 2,3, and 4 with the following exception. The Process B data delivery may be fully automatic or system-initiated, without requiring any user-initiated trigger event.

In some embodiments, all of the various methods and processes provided herein may be utilized, with the following additions. The balance of the missing segments that are delivered may be a "scalable" type of file, or any type of scalable streaming technology. In some embodiments, H.264 SVC is used as the compression codec, however, other codecs or scalable-type files are also suitable. H.264 SVC encodes video into "layers," starting with the "base" layer, which contains the lowest level of detail spatially (resolution), or temporally (frames per second), or from a quality perspective (greater pixel data, etc.). Additional layers may increase the quality of the stream using any or all of these variables.

In some embodiments, all of the various methods and processes described herein may be utilized, with the following additions. In this embodiment, the Process A data that is downloaded in the initial process is a "base" layer. The base layer may be comprised of various levels of detail spatially (the number of pixels), or temporally (frames per second), or other aspects (for example, pixel data relating to color or luminance, or other qualitative aspects of the content). This base layer may represent the entire duration of the whole video, or just a portion of the whole video's duration.

The base layer may be automatically targeted and downloaded to the user completely independent of any user-initiated trigger event (this may be more similar to other embodiments provided herein). Alternatively, the base layer may be background-downloaded as the result of a user-initiated trigger-event.

A balance of missing data delivered via Process B represents additional data that adds upon the base layer. In other embodiments, this may occur after the user initiates playback of content that has been designated as available via a "New Content" notification; however, other methods are also suitable.

In another embodiment, all of the various methods provided herein may be utilized, with the following additions. This embodiment is relevant for requirements like Volumetric Display Devices, existing and future 3D formats, and other emerging and future technologies. The client-side application may download a portion of data comprising an object or group of objects in advance of a real-time data delivery requirement. By offloading to a prior process a portion of what may have been a real-time delivery requirement, greater resources may be utilized to facilitate the actual real-time delivery of the balance of the full data requirement.

Further, although the initial data segment that is pulled by (or pushed to) the client may comprise data that is the initial portion of a sequential experience, this does not have to necessarily be the case. It is also suitable that the initial delivery of data that is pulled by (or pushed to) the client comprises a framework element and/or a foundational element that may need to be present in conjunction with the data that is brought down in real time. Alternatively, the previously delivered data may not be required to effectuate presentation of the subsequent real time delivery; rather, it may provide the function of augmentation and enhancement.

Examples

The following series of specific examples are to be construed as merely illustrative, and not limitative of the remainder of the disclosure in any way whatsoever. The examples described herein reference and provide non-limiting support to the various embodiments described in the preceding sections.

Examples of the server-side infrastructure in certain embodiments comprises data centers (sometimes referred to as "server farms"), or cloud environments (these environments are offered by companies like Amazon, Google, Microsoft, etc.), or content delivery networks (companies like Akamai, Limelight, etc.). These are infrastructure environments that may host the invention's server-side software components. Various server-side software components of the invention may be hosted in a single environment, or a combination of these environments. When hosted in multiple environments, the invention's server-side components may interact in an orchestrated fashion to facilitate system processes.

As another example, provided is a client-side software. The client-side software resides on end-user client devices. Examples of client devices may comprise PC or Mac desktops, iPads, tablet devices, smart mobile devices, video game hardware like Xbox, TV "set-top boxes", or any type of device that runs an operating system suitable for hosting the client-side software application. A user may install the client-side software via website download, or from disk media, or from an online distributor like the Apple app store. The user may then launch the application and navigate a user interface that manages and presents video content.

Users may opt in to receive content from their favorite content providers that participate in the content delivery system. The platform facilitates a highly targeted delivery of content that is very relevant to the user's interests and preferences.

Users are notified when new content is available, and may be presented with UI elements (for example, thumbnails or other graphical objects) that indicate the availability of new content.

When the user launches a video, the video launches instantly without any perceptible delay. Also, the quality of the video is not limited by the bandwidth of the user's connection. From a user experience perspective, the best of both worlds have been achieved: an immediate launch without delay, and extraordinary video quality that far exceeds Internet video modalities.

The server-client system intelligently manages delivery of content for the user in a way that prudently respects the user's bandwidth and storage resources. Rather than downloading an entire file to the user prior to interaction, only a portion of data is delivered prior to the issuing of a notification or UI element informing the user regarding the availability of new content. The balance of the data required to support an extraordinary video experience is then triggered when the user initiates playback of the initial portion of data that was delivered prior to the notification. From the user's perspective the experience is seamless.

The system may calculate the requirement for the process one data that is delivered prior to the notification. If a user has relatively high bandwidth at the time when the user is presented with new content, the system knows this and provides a modest requirement of preemptively downloaded data to support a very high quality video experience. On the other hand, if a user is sitting at Starbucks with a laptop and has a slow connection, the user will still experience the same extraordinary video quality that launches instantly. The system has recognized their bandwidth environment, and has compensated by preemptively downloading a greater amount of process one data prior to alerting the user regarding the availability of new content.

For users who want to receive fresh video content from their favorite content providers, this system functions as an "intelligent agent" that proactively provides highly desirable content tailored to the user's interests. Users may build libraries of their favorite content, and share content with other users of the system.

Content producers benefit from this platform as well. They are able to engage their Internet audience with the full quality of their video production, while also being able to reach their core user base in a proactive fashion and ongoing basis.

The system also provides very important benefits regarding network and server-side infrastructure and resources. This is because the system utilizes a robust server-client interaction that is able to regulate network traffic and bandwidth conditions. The system innovatively utilizes historical data gathered from both the client side and server side of the architecture in order to construct a predictive analysis. Therefore the system may anticipate negative events that will occur in an impending time frame, and proactively redirect and reallocate system resources to insure optimum system efficiency and effectiveness. Within embodiments, the system may be able to implement highly effective response to real-time conditions, and even anticipate impending conditions; thereby intelligently managing.

Further Embodiments of VDE

In further embodiments, VDE may provide methods, devices, systems and software including a server-side and client-side Internet system that creates a very high quality video experience and provides a solution to the initial delay or subsequent playback interruption that is often characteristic of both True Streaming and Progressive Download and Play when these modalities attempt to deliver very high bit-rate video over a consumer broadband Internet connection.

Furthermore, in one embodiment, the subject matter provided herein performs unique operations and processes that create significant benefits when compared to True Streaming, Progressive Download and Play, and Automatic Download and Play. Some of these advantages include greater efficiency, effectiveness, flexibility, and/or cost benefits.

Within implementations, the scope of the subject matter described herein is not limited to Internet applications, but rather is also applicable to other networks, including for example private networks. In alternative embodiments, the subject matter described herein is directed to all data transmission, including video, and other types of digital content formats and technologies.

One advantage of the subject matter described herein is enabling a user to view a whole video experience that launches without the delay characteristic of Internet video modalities. In addition, the whole video experience may be displayed with quality based on a data-rate that exceeds the data-rate enabled by the user's Internet connection, while also providing the user with the benefit of a process that is seamless yet prudently conserves end-user bandwidth and end-user storage resources required to deliver a second process data until such a time that the user chooses to initiate playback of a first process data. Another advantage of the methods, devices, systems and software applications described herein is an Anticipative Prioritization Analytical Engine that regulates the total number of notifications to a user that are permitted at a particular point in time, and/or the qualification criteria that will be permitted (e.g., an assessment of the amount of process two data delivery that will be incurred as a result of issuing notifications or user interface elements), in order to regulate network traffic or server-side bandwidth, or avert bandwidth spikes or other negative network or server-side conditions that are not conducive to efficient or effective system function or business objectives.

Data Transmission Systems

Accordingly, in one aspect provided herein is a data transmission system comprising: (a) a digital processing device that is connected to a network or is capable of being connected to a network, wherein said processing device comprises memory and an operating system configured to perform executable instructions; and (b) a computer program operably connected to said digital processing device, including executable instructions that facilitate data transmission, that comprises: (i) a software module for issuing a notification, or a user interface element, to a user after delivery of a process one data from a server to a client; and (ii) a software module for triggering a background delivery of a process two data, wherein the triggering occurs when the user initiates playback of said process one data. may In some embodiments, a particular software module may perform one or more functions described herein. Thus, in some embodiments, the software module for issuing a notification, or a user interface element, to a user after delivery of a process one data from a server to a client is the same as the software module for triggering a background delivery of a process two data, wherein the triggering occurs when the user initiates playback of said process one data. In further or additional embodiments, the software module for issuing a notification, or a user interface element, to a user after delivery of a process one data from a server to a client is different from the software module for triggering a background delivery of a process two data, wherein the triggering occurs when the user initiates playback of said process one data. Such is also the case for the other software modules provided herein.

In some embodiments, the delivery of process one data is initiated by the server or the client. In further or additional embodiments, the user initiates playback of said process one data by engaging a user-interface element. In one embodiment, the server further comprises a plurality of servers in a datacenter, or a cloud environment, or a content delivery network, or a combination of these environments. In yet another embodiment, the client is a device that is operably connected to or capable of being operably connected to the server via a network protocol. In some embodiments, the client device is intermittently or continuously connected to the server.

In one embodiment, the process one data comprises at least a portion of a video or other digital content. In a further or additional embodiment, the process one data comprises: (1) a discrete video or other digital content or (2) a portion of a discrete video or other digital content.

In another embodiment, the system further comprises a software module for delivering or presenting video data to a user. As discussed herein, and as is the case with all software modules described herein, the software module may be the same as or different from other software modules provided herein. In some embodiments, the system further requires a software module for calculating a requirement for a duration of video playback or other digital content that may be satisfied by said process one data. In further or additional embodiments, the calculating said requirement for a duration of video playback or other digital content is performed in order to provide a sufficient time window. In one embodiment, the calculating requirement for said sufficient time window is based on at least one of:

a data throughput rate at which data may be transferred from said server to said client;

a data throughput rate that may be required to deliver the process two data within a time frame commensurate to its playback duration;

a predicted data throughput rate at which data may be transferred from said server to said client at a future point in time;

an amount of data that the process two data is comprised of; or a duration of playback that will be performed by the process two data.

In another embodiment, the process two data comprises:

a subsequent portion of a video or other digital content of which said process one comprised an initial portion; or a discrete video that is different from a discrete video or other digital content derived from said process one data.

In an embodiment, the sufficient time window is an amount of time necessary to facilitate a sufficient amount of said process two data to be transferred at a future point in time. In a further or additional embodiment, the system further comprises a software module for delivering a transfer of said process one data from said server to said client. In one embodiment, the system further comprises a software module for storing said process one data on client device. In some embodiments, the client device is either a desktop computer, or a laptop computer, or a tablet computing device, or a smart phone device, or a video game hardware device, or a television set-top-box device, or a digital video or other digital content recording device, or a network enabled computing device, or a network enabled display device, and/or a volumetric display device, or any type of holographic imaging device. In certain embodiments, the system further comprises a software module for issuing a notification or a user interface element to the user informing the user regarding the availability of content that may be engaged at a point in time subsequent to said transfer of said process one data.

In another embodiment, the notification is comprised of a visual or audio element alerting the user regarding the availability of new content. In some embodiments, the user-interface element may be engaged by the user to initiate a media player playback or other digital device playback of said process one video data or other digital content. In certain embodiments, the system further comprises a software module for initiating playback of a locally stored video or other digital content comprised of said process one data when said user-interface element is engaged by the user.

In some embodiments, the system further comprises a software module for storing said process two data as it is received by the client-device. In certain embodiments, the system further comprises a software module for queuing at least a portion of said process two data to be played back in an automatic fashion by said media player or other digital device directly following the consummation of playback of said process one data. In one embodiment, the system further comprises a software module for predicting said data throughput rate at which data may be transferred from said server to said client at a future point in time. In some embodiments, the data throughput rate is predicted based on historical data gathered by client-side or server-side components and the utilization of this historical data to construct a predictive analysis.

In one embodiment, the system further comprises a software module for selecting an appropriate video file or other digital content for said process one or said process two. In certain embodiments, the selection of the appropriate video file or other digital content is based on an analysis of the encoded bitrate or file size or playback duration or data throughput rate required for delivery of said appropriate video file relative to a current or anticipated data throughput rate at which data may be transferred from said server to said client. In further or additional embodiments, the system further comprises a software module for determining an optimum scheduling time for said process one data delivery.

In one embodiment, the determination of an optimum scheduling time is based on at least one of the following: efficient or effective utilization of server-side hardware; or efficient or effective utilization of network resources; or regulation of system bandwidth; or management of client-device storage; or management of client-side bandwidth resources; or prioritization for clients that historically exhibit a relatively low client-side bandwidth environment. In certain embodiments, the system comprises a software module on either the server-side or the client-side for determining whether the issuing of said notification or said user interface element is to occur to the user. In one embodiment, the determination to issue or hold back said notification or said user interface element is based on analysis of the present client-side bandwidth or the present data throughput rate at which data may be transferred from said server to said client.

In still further or additional embodiments, provided is a software module on either the server-side or the client-side that may determine or calculate or execute the requirement for a supplemental amount of data to be added to said process one data on said client prior to the issuing of said notification or said user interface element. In some embodiments, the supplemental amount of data is comprised of video data or other digital content that will be queued for playback prior to a playback of said process one data. In certain embodiments, the supplemental amount of data is comprised of video data or other digital content that will be queued for playback at an edit point prior to the consummation of playback of said process one data. In certain embodiments, the supplemental amount of data is comprised of video data or other digital content that will be queued for playback after the consummation of playback of said process one data. In still further or additional embodiments, the supplemental amount of data is procured from a server-side file storage. In yet further or additional embodiments, the supplemental amount of data is procured from a client-side file storage.

In one embodiment, the system further comprises a software module on either the server-side or the client-side that may determine or calculate or execute the requirement for a supplemental amount of data to be added to said process one data on said client after the issuing of said notification or said user interface element has already occurred. In one embodiment, the supplemental amount of data is procured from a server-side file storage. In yet a further or additional embodiment, the supplemental amount of data is procured from a client-side file storage. In some embodiments, the supplemental amount of data is comprised of video or other digital content that will be queued for playback at a point that is either prior to initial playback of said process one data, or at an edit point during the playback of said process one data, or after consummation of playback of said process one data.

In yet additional or further embodiments, the system comprises a software module on either the server-side or the client-side that may determine or calculate or execute the requirement for a supplemental amount of data to be inserted at an edit point prior to the consummation of a playback of said process two data. In one embodiment, the supplemental amount of data is procured from a client-side file storage. In yet further or additional embodiments, the supplemental amount of data is comprised of video or other digital content.

In some embodiments, calculations to determine a requirement for process one data is performed by the server. In certain embodiments, calculations to determine a requirement for process one data is performed by the client. In still further or additional embodiments, calculations to determine a requirement for process two data is performed by the server. In some embodiments, calculations to determine a requirement for process two data is performed by the client.

In yet further or additional embodiments, the system user interface element is a thumbnail or other object presented within a graphical user interface, or a visual or audible or sensory notification presented by a medium or object or device that is not a graphical user interface, that serves the function of indicating to the user the presence or availability of content.

Data Transmission Computer Programs

In another aspect, provided herein is a computer readable medium encoded with a computer program including instructions executable by an operating system of a digital processing device, wherein said instructions facilitate data transmission, that comprises: (i) a software module for issuing a notification or a user interface element to a user after delivery of a process one data from a server to a client; and (ii) a software module for triggering a background delivery of a process two data, wherein the triggering occurs when the user initiates playback of said process one data.

In some embodiments, the delivery of process one data is initiated by the server or the client. In further or additional embodiments, the user initiates playback of said process one data by engaging a user-interface element. In one embodiment, the server further comprises a plurality of servers in a datacenter, or a cloud environment, or a content delivery network, or a combination of these environments. In yet another embodiment, the client is a device that is operably connected to or capable of being operably connected to the server via a network protocol. In some embodiments, the client device is intermittently or continuously connected to the server.

In one embodiment, the process one data comprises at least a portion of a video or other digital content. In a further or additional embodiment, the process one data comprises: (1) a discrete video or other digital content or (2) a portion of a discrete video or other digital content.

In another embodiment, the medium further comprises a software module for delivering or presenting video data or other digital content to a user. As discussed herein, and as is the case with all software modules described herein, the software module may be the same as or different from other software modules provided herein.

In some embodiments, the medium further comprises a software module for calculating a requirement for a duration of video playback or other digital content that may be satisfied by said process one data. In further or additional embodiments, the calculating said requirement for a duration of video playback or other digital content is performed in order to provide a sufficient time window. In one embodiment, the calculating requirement for said sufficient time window is based on at least one of:

a data throughput rate at which data may be transferred from said server to said client;

a data throughput rate that may be required to deliver the process two data within a time frame commensurate to its playback duration;

a predicted data throughput rate at which data may be transferred from said server to said client at a future point in time;

an amount of data that the process two data is comprised of; or a duration of playback that will be performed by the process two data.

In another embodiment, the process two data comprises:

a subsequent portion of a video or other digital content of which said process one comprised an initial portion; or a discrete video or other digital content that is different from a discrete video or other digital content derived from said process one data.

In an embodiment, the sufficient time window is an amount of time necessary to facilitate a sufficient amount of said process two data to be transferred at a future point in time. In a further or additional embodiment, the medium further comprises a software module for delivering a transfer of said process one data from said server to said client. In one embodiment, the medium further comprises a software module for storing said process one data on client device. In some embodiments, the client device is either a desktop computer, or a laptop computer, or a tablet computing device, or a smart phone device, or a video game hardware device, or a television set-top-box device, or a digital video or other digital content recording device, or a network enabled computing device, or a network enabled display device, and/or a volumetric display device, or any type of holographic imaging device. In certain embodiments, the medium further comprises a software module for issuing a notification or a user interface element to the user informing the user regarding the availability of content that may be engaged at a point in time subsequent to said transfer of said process one data.

In another embodiment, the notification is comprised of a visual or audio element alerting the user regarding the availability of new content. In some embodiments, the user-interface element may be engaged by the user to initiate a media player playback or other digital device playback of said process one video data or other digital content. In certain embodiments, the medium further comprises a software module for initiating playback of a locally stored video or other digital content comprised of said process one data when said user-interface element is engaged by the user.

In some embodiments, the medium further comprises a software module for storing said process two data as it is received by the client-device. In certain embodiments, the medium further comprises a software module for queuing at least a portion of said process two data to be played back in an automatic fashion by said media player or other digital device directly following the consummation of playback of said process one data. In one embodiment, the medium further comprises a software module for predicting said data throughput rate at which data may be transferred from said server to said client at a future point in time. In some embodiments, the data throughput rate is predicted based on historical data gathered by client-side or server-side components and the utilization of this historical data to construct a predictive analysis.

In one embodiment, the medium further comprises a software module for selecting an appropriate video file or other digital content for said process one or said process two. In certain embodiments, the selection of the appropriate video file or other digital content is based on an analysis of the encoded bitrate or file size or playback duration or data throughput rate required for delivery of said appropriate video file or other digital content relative to a current or anticipated data throughput rate at which data may be transferred from said server to said client. In further or additional embodiments, the medium further comprises a software module for determining an optimum scheduling time for said process one data delivery.

In one embodiment, the determination of an optimum scheduling time is based on at least one of the following: efficient or effective utilization of server-side hardware; or efficient or effective utilization of network resources; or regulation of system bandwidth; or management of client-device storage; or management of client-side bandwidth resources; or prioritization for clients that historically exhibit a relatively low client-side bandwidth environment. In certain embodiments, the medium comprises a software module on either the server-side or the client-side for determining whether the issuing of said notification or said user interface element is to occur to the user. In one embodiment, the determination to issue or hold back said notification or said user interface element is based on analysis of the present client-side bandwidth or the present data throughput rate at which data may be transferred from said server to said client. In still further or additional embodiments, provided is a software module on either the server-side or the client-side that may determine or calculate or execute the requirement for a supplemental amount of data to be added to said process one data on said client prior to the issuing of said notification or said user interface element. In some embodiments, the supplemental amount of data is comprised of video data or other digital content that will be queued for playback prior to a playback of said process one data. In certain embodiments, the supplemental amount of data is comprised of video data that will be queued for playback at an edit point prior to the consummation of playback of said process one data. In still further or additional embodiments, the supplemental amount of data is procured from a server-side file storage. In yet further or additional embodiments, the supplemental amount of data is procured from a client-side file storage.

In one embodiment, the medium further comprising a software module on either the server-side or the client-side that may determine or calculate or execute the requirement for a supplemental amount of data to be added to said process one data on said client after the issuing of said notification or said user interface element has already occurred. In one embodiment, the medium comprises supplemental amount of data is procured from a server-side file storage. In yet a further or additional embodiment, supplemental amount of data is procured from a client-side file storage.

In another embodiment, the supplemental amount of data is comprised of video or other digital content that will be queued for playback at a point that is either prior to initial playback of said process one data, or at an edit point during the playback of said process one data, or after consummation of playback of said process one data. In some embodiments, the supplemental amount of data is comprised of video or other digital content that will be queued for playback at a point that is either prior to initial playback of said process one data, or at an edit point during the playback of said process one data, or after consummation of playback of said process one data. In yet additional or further embodiments, the medium comprises a software module on either the server-side or the client-side that may determine or calculate or execute the requirement for a supplemental amount of data to be inserted at an edit point prior to the consummation of a playback of said process two data. In one embodiment, a supplemental amount of data is procured from a client-side file storage. In yet further or additional embodiments, the supplemental amount of data is comprised of video or other digital content.

In some embodiments, calculations to determine a requirement for process one data is performed by the server. In certain embodiments, calculations to determine a requirement for process one data is performed by the client. In still further or additional embodiments, calculations to determine a requirement for process two data is performed by the server. In some embodiments, calculations to determine a requirement for process two data is performed by the client.

In yet further or additional embodiments, the system user interface element is a thumbnail or other object presented within a graphical user interface, or a visual or audible or sensory notification presented by a medium or object or device that is not a graphical user interface, that serves the function of indicating to the user the presence or availability of content.

Data Receiving Methods

In yet another aspect, provided is a method of receiving data from a server comprising the steps of: (i) issuing a notification or a user interface element to a user after delivery of a process one data from the server to a client; and (ii) triggering a background delivery of a process two data, wherein the triggering occurs when the user initiates playback of said process one data. In some embodiments, the delivery of process one data is initiated by the server or the client. In certain embodiments, the user initiates playback of said process one data by engaging a user-interface element. In some embodiments, the server further comprises a plurality of servers in a datacenter, or a cloud environment, or a content delivery network, or a combination of these environments. In certain embodiments, the client is a device that is operably connected to or capable of being operably connected to the server via a network protocol. In yet further or additional embodiments, the client device is intermittently or continuously connected to the server. In yet further or additional embodiments, the process one data comprises at least a portion of a video or other digital content. In some embodiments, the process one data comprises: (1) a discrete video or other digital content or (2) a portion of a discrete video or other digital content.

In some embodiments, the method provided herein further comprises the step of delivering or presenting video data or other digital content to a user. In certain embodiments, the method further comprises the step of calculating a requirement for a duration of video playback or other digital content that may be satisfied by said process one. In further or additional embodiments, the calculating said requirement for a duration of video playback or other digital content is performed in order to provide a sufficient time window. In some embodiments, the calculating requirement for said sufficient time window is based on at least one of:

a data throughput rate at which data may be transferred from said server to said client, or a data throughput rate that may be required to deliver the process two data within a time frame commensurate to its playback duration, or a predicted data throughput rate at which data may be transferred from said server to said client at a future point in time, or an amount of data that the process two data is comprised of, or a duration of playback that will be performed by the process two data.

In some embodiments, the process two data comprises:

a subsequent portion of a video or other digital content of which said process one comprised an initial portion; or a discrete video or other digital content that is different from a discrete video or other digital content derived from said process one data.

In an embodiment, the sufficient time window is an amount of time necessary to facilitate a sufficient amount of said process two data to be transferred at a future point in time. In a further or additional embodiment, the method further comprises the step of delivering a transfer of said process one data from said server to said client. In one embodiment, the method further comprises the step of storing said process one data on client device. In some embodiments, the client device is either a desktop computer, or a laptop computer, or a tablet computing device, or a smart phone device, or a video game hardware device, or a television set-top-box device, or a digital video or other digital content recording device, or a network enabled computing device, or a network enabled display device, and/or a volumetric display device, or any type of holographic imaging device. In certain embodiments, the method further comprises the step of issuing a notification or a user interface element to the user informing the user regarding the availability of content that may be engaged at a point in time subsequent to said transfer of said process one data.

In another embodiment, the notification is comprised of a visual or audio element alerting the user regarding the availability of new content. In some embodiments, the user-interface element may be engaged by the user to initiate a media player playback or other digital device playback of said process one video data or other digital content. In certain embodiments, the method further comprises the step of initiating playback of a locally stored video or other digital content comprised of said process one data when said user-interface element is engaged by the user.

In some embodiments, the method further comprises the step of storing said process two data as it is received by the client-device. In certain embodiments, the method further comprises the step of queuing at least a portion of said process two data to be played back in an automatic fashion by said media player or other digital device directly following the consummation of playback of said process one data. In one embodiment, the method further comprises the step of predicting said data throughput rate at which data may be transferred from said server to said client at a future point in time. In some embodiments, the data throughput rate is predicted based on historical data gathered by client-side or server-side components and the utilization of this historical data to construct a predictive analysis.

In one embodiment, the method further comprises the step of selecting an appropriate video file or other digital content for said process one or said process two. In certain embodiments, the selection of the appropriate video file or other digital content is based on an analysis of the encoded bitrate or file size or playback duration or data throughput rate required for delivery of said appropriate video file or other digital content relative to a current or anticipated data throughput rate at which data may be transferred from said server to said client.

In further or additional embodiments, the method further comprises the step of determining an optimum scheduling time for said process one data delivery. In one embodiment, the determination of an optimum scheduling time is based on at least one of the following: efficient or effective utilization of server-side hardware; or efficient or effective utilization of network resources; or regulation of system bandwidth; or management of client-device storage; or management of client-side bandwidth resources; or prioritization for clients that historically exhibit a relatively low client-side bandwidth environment.

In certain embodiments, the method comprises the step of determining whether the issuing of said notification or said user interface element is to occur to the user. In one embodiment, the determination to issue or hold back said notification or said user interface element is based on analysis of the present client-side bandwidth or the present data throughput rate at which data may be transferred from said server to said client. In one embodiment, the determination to issue or hold back said notification or said user interface element is executed by a client-side component. In another embodiment, the determination to issue or hold back said notification or said user interface element is executed by a server-side component.

In still further or additional embodiments, provided is a method that determines or calculates or executes the requirement for a supplemental amount of data to be added to said process one data on said client prior to the issuing of said notification or said user interface element. In some embodiments, the supplemental amount of data is comprised of video data or other digital content that will be queued for playback to occur prior to a playback of said process one data. In certain embodiments, the supplemental amount of data is comprised of video data or other digital content that will be queued for playback to occur at an edit point prior to the consummation of playback of said process one data. In some embodiments, the supplemental amount of data is comprised of video data or other digital content that will be queued for playback to occur after playback of said process one data. In still further or additional embodiments, the supplemental amount of data is procured from a server-side file storage. In yet further or additional embodiments, the supplemental amount of data is procured from a client-side file storage.

In one embodiment, the method further comprises the step of determining or calculating or executing the requirement for a supplemental amount of data to be added to said process one data on said client after the issuing of said notification or said user interface element has already occurred. In one embodiment, the method comprises procuring supplemental data from a server-side file storage. In yet a further or additional embodiment, a supplemental amount of data is procured from a client-side file storage.

In another embodiment, the supplemental amount of data is comprised of video or other digital content that will be queued for playback to occur at a point that is either prior to initial playback of said process one data, or at an edit point during the playback of said process one data, or for playback to occur after consummation of playback of said process one data.

In yet additional or further embodiments, the method comprises the step on either the server-side or the client-side that determines or calculates or executes the requirement for a supplemental amount of data to be inserted at an edit point prior to the consummation of a playback of said process two data. In one embodiment, a supplemental amount of data is procured from a client-side file storage. In another embodiment, a supplemental amount of data is procured from a server-side file storage. In yet further or additional embodiments, the supplemental amount of data is comprised of video or other digital content.

In some embodiments, calculations to determine a requirement for process one data is performed by the server. In certain embodiments, calculations to determine a requirement for process one data is performed by the client. In still further or additional embodiments, calculations to determine a requirement for process two data is performed by the server. In some embodiments, calculations to determine a requirement for process two data is performed by the client.

In yet further or additional embodiments, the system user interface element is a thumbnail or other object presented within a graphical user interface, or a visual or audible or sensory notification presented by a medium or object or device that is not a graphical user interface, that serves the function of indicating to the user the presence or availability of content.

System For Regulating Notifications

In one aspect, provided herein is a data transmission system comprising: (a) a digital processing device that is connected to a computer network, wherein said processing device comprises memory and an operating system configured to perform executable instructions; and (b) a computer program that is operably connected to or is capable of being operably connected to said digital processing device, including executable instructions that provide for the management of the data transmission, that comprises a software module for regulating an issuing of a notification or user interface element that may be issued to indicate a delivery of a process one data from a server to a client, wherein the regulating thereby avoids a system condition that may result from a triggering of a delivery of a process two data upon initiation of playback of said process one data.

In one embodiment, the issuing of a notification or user interface element is issued by the client. In further or additional embodiments, the issuing of a notification or user interface element is issued by the server. In still further or additional embodiments, the system condition is a server-side bandwidth condition, or a server-side traffic condition, or a network bandwidth condition, or a network traffic condition. In still further or additional embodiments, the system comprises a software module for managing when issuing of said notification or user interface element may occur to a user in order to avert bandwidth spikes, or avert impending heavy traffic conditions, or avert other impending server-side or network conditions that are not conducive to optimum system function or business objectives. In yet an additional embodiment, the system comprises the managing when issuing of said notification or user interface element occurs is calculated in part based on a predictive anticipation of impending server-side bandwidth or traffic conditions. In further or additional embodiments, the predictive anticipation of impending server-side bandwidth or traffic conditions proceeds from a predictive analysis that considers historical data that was gathered by client-side or server-side components.

Computer Programs For Regulating Notifications

In another aspect, provided herein is computer readable medium encoded with a computer program including instructions executable by the operating system of a digital processing device, wherein said instructions facilitate data transmission, that comprises a software module for regulating an issuing of a notification or user interface element that may be issued to indicate a delivery of a process one data from a server to a client, wherein the regulating thereby avoids a system condition that may result from a triggering of a delivery of a process two data upon initiation of playback of said process one data.

In one embodiment, the issuing of a notification or user interface element is issued by the client. In further or additional embodiments, the issuing of a notification or user interface element is issued by the server. In still further or additional embodiments, the system condition is a server-side bandwidth condition, or a server-side traffic condition, or a network bandwidth condition, or a network traffic condition. In still further or additional embodiments, the medium comprises a software module for managing when issuing of said notification or user interface element may occur to a user in order to avert bandwidth spikes, or avert impending heavy traffic conditions, or avert other impending server-side or network conditions that are not conducive to optimum system function or business objectives. In yet an additional embodiment, the medium comprises the managing when issuing of said notification or user interface element occurs is calculated in part based on a predictive anticipation of impending server-side bandwidth or traffic conditions. In further or additional embodiments, the predictive anticipation of impending server-side bandwidth or traffic conditions proceeds from a predictive analysis that considers historical data that was gathered by client-side or server-side components.

Regulating Notifications Methods

In a further embodiment, provided herein is a method of data transmission comprising the step of regulating an issuing of a notification or user interface element that may be issued to indicate a delivery of a process one data from a server to a client, wherein the regulating thereby avoids a system condition that may result from a triggering of a delivery of a process two data upon initiation of playback of said process one data.

In one embodiment, the issuing of a notification or user interface element is issued by the client. In further or additional embodiments, the issuing of a notification or user interface element is issued by the server. In still further or additional embodiments, the system condition is a server-side bandwidth condition, or a server-side traffic condition, or a network bandwidth condition, or a network traffic condition. In still further or additional embodiments, the method comprises a step of managing when issuing of said notification or user interface element may occur to a user in order to avert bandwidth spikes, or avert impending heavy traffic conditions, or avert other impending server-side or network conditions that are not conducive to optimum system function or business objectives. In yet an additional embodiment, the method comprises a step of managing when issuing of said notification or user interface element occurs is calculated in part based on a predictive anticipation of impending server-side bandwidth or traffic conditions. In further or additional embodiments, the predictive anticipation of impending server-side bandwidth or traffic conditions proceeds from a predictive analysis that considers historical data that was gathered by client-side or server-side components.

VDE Controller

Figure 9:
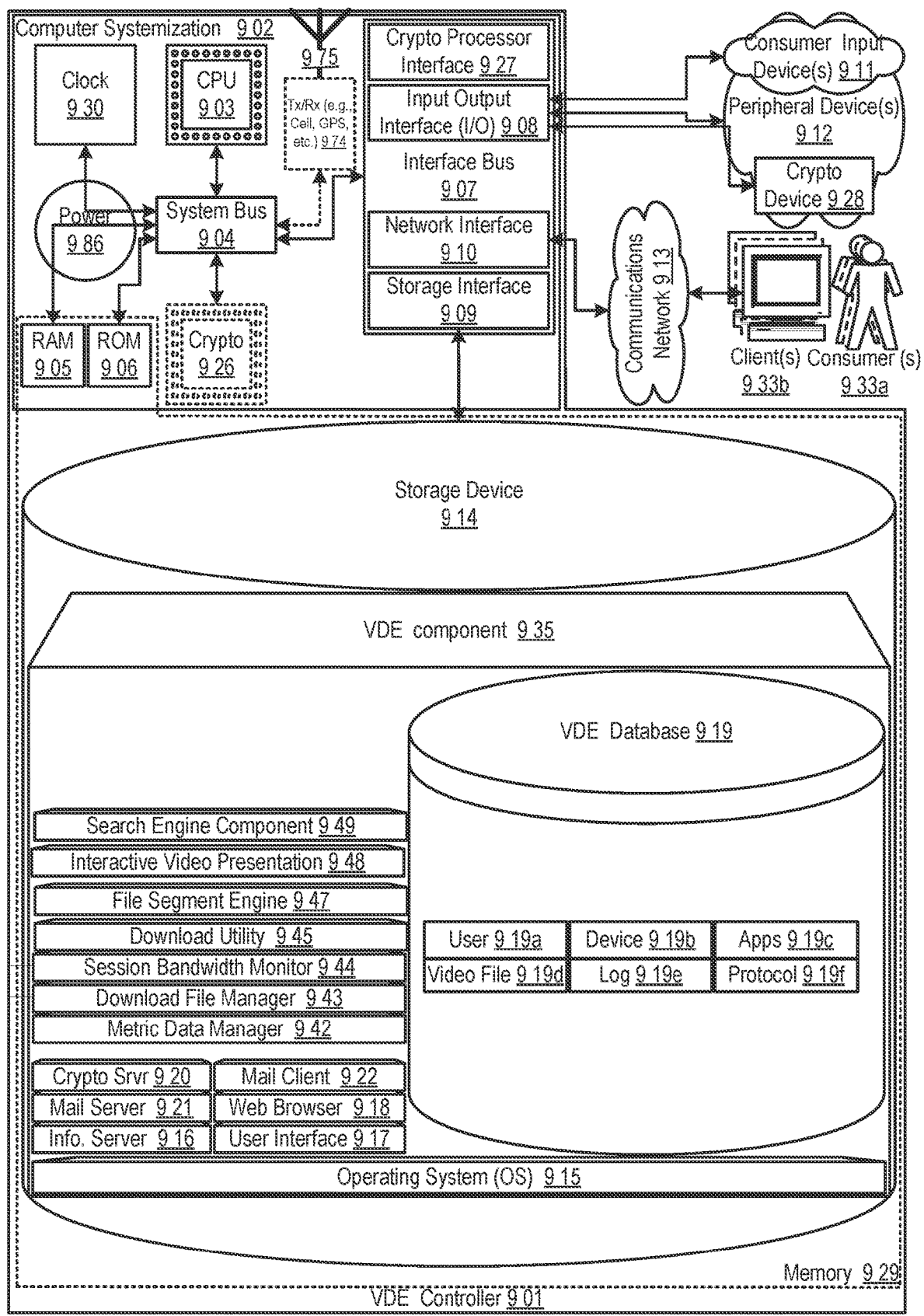
FIG. 9 shows a block diagram illustrating example aspects of a VDE controller.

FIG. 9 shows a block diagram illustrating example aspects of a VDE controller 901. In this embodiment, the VDE controller 901 may serve to aggregate, process, store, search, serve, identify, instruct, generate, match, and/or facilitate interactions with a computer through various technologies, and/or other related data.

Users, e.g., 933a, which may be people and/or other systems, may engage information technology systems (e.g., computers) to facilitate information processing. In turn, computers employ processors to process information; such processors 903 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 929 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the VDE controller 901 may be connected to and/or communicate with entities such as, but not limited to: one or more users from user input devices 911; peripheral devices 912; an optional cryptographic processor device 928; and/or a communications network 913. For example, the VDE controller 901 may be connected to and/or communicate with users, e.g., 933a, operating client device(s), e.g., 933*b*, including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™, HP Slate™, Motorola Xoom™, etc.), eBook reader(s) (e.g., Amazon Kindle™ Barnes and Noble's Nook™ eReader, etc.), laptop computer(s), notebook(s), netbook(s), gaming console(s) (e.g., XBOX Live™, Nintendo® DS, Sony PlayStation® Portable, etc.), portable scanner(s), and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The VDE controller 901 may be based on computer systems that may comprise, but are not limited to, components such as: a computer systemization 902 connected to memory 929.

Computer Systemization

A computer systemization 902 may comprise a clock 930, central processing unit ("CPU(s)" and/or "processor(s)" (these terms are used interchangeably throughout the disclosure unless noted to the contrary)) 903, a memory 929 (e.g., a read only memory (ROM) 906, a random access memory (RAM) 905, etc.), and/or an interface bus 907, and most frequently, although not necessarily, are all interconnected and/or communicating through a system bus 904 on one or more (mother)board(s) 902 having conductive and/or otherwise transportive circuit pathways through which instructions (e.g., binary encoded signals) may travel to effectuate communications, operations, storage, etc. The computer systemization may be connected to a power source 986; e.g., optionally the power source may be internal. Optionally, a cryptographic processor 926 and/or transceivers (e.g., ICs) 974 may be connected to the system bus. In another embodiment, the cryptographic processor and/or transceivers may be connected as either internal and/or external peripheral devices 912 via the interface bus I/O. In turn, the transceivers may be connected to antenna(s) 975, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing VDE controller to determine its location)); Broadcom BCM4329FKUBG transceiver chip (e.g., providing 802.11n, Bluetooth 2.1+EDR, FM, etc.), BCM28150 (HSPA+) and BCM2076 (Bluetooth 4.0, GPS, etc.); a Broadcom BCM4750IUB8 receiver chip (e.g., GPS); an Infineon Technologies X-Gold 618-PMB9800 (e.g., providing 2G/3G HSDPA/HSUPA communications); Intel's XMM 7160 (LTE & DC-HSPA), Qualcom's CDMA(2000), Mobile Data/Station Modem, Snapdragon; and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: floating point units, integer processing units, integrated system (bus) controllers, logic operating units, memory management control units, etc., and even specialized processing sub-units like graphics processing units, digital signal processing units, and/or the like. Additionally, processors may include internal fast access addressable memory, and be capable of mapping and addressing memory 929 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor may construct and decode allowing it to access a circuit path to a specific memory address space having a memory state/value. The CPU may be a microprocessor such as: AMD's Athlon, Duron and/or Opteron; ARM's classic (e.g., ARM7/9/11), embedded (Coretx-M/R), application (Cortex-A), embedded and secure processors; IBM and/or Motorola's DragonBall and PowerPC; IBM's and Sony's Cell processor; Intel's Atom, Celeron (Mobile), Core (2/Duo/i3/i5/i7), Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code). Such instruction passing facilitates communication within the VDE controller and beyond through various interfaces. Should processing requirements dictate a greater amount speed and/or capacity, distributed processors (e.g., Distributed VDE), mainframe, multi-core, parallel, and/or super-computer architectures may similarly be employed. Alternatively, should deployment requirements dictate greater portability, smaller mobile devices (e.g., smartphones, Personal Digital Assistants (PDAs), etc.) may be employed.

Depending on the particular implementation, features of the VDE may be achieved by implementing a microcontroller such as CAST's R8051XC2 microcontroller; Intel's MCS 51 (i.e., 8051 microcontroller); and/or the like. Also, to implement certain features of the VDE, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the VDE component collection (distributed or otherwise) and/or features may be implemented via the microprocessor and/or via embedded components; e.g., via ASIC, coprocessor, DSP, FPGA, and/or the like. Alternately, some implementations of the VDE may be implemented with embedded components that are configured and used to achieve a variety of features or signal processing.

Depending on the particular implementation, the embedded components may include software solutions, hardware solutions, and/or some combination of both hardware/software solutions. For example, VDE features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects may be programmed by the customer or designer, after the FPGA is manufactured, to implement any of the VDE features. A hierarchy of programmable interconnects allow logic blocks to be interconnected as needed by the VDE system designer/administrator, somewhat like a one-chip programmable breadboard. An FPGA's logic blocks may be programmed to perform the operation of basic logic gates such as AND, and XOR, or more complex combinational operators such as decoders or simple mathematical operations. In most FPGAs, the logic blocks also include memory elements, which may be circuit flip-flops or more complete blocks of memory. In some circumstances, the VDE may be developed on regular FPGAs and then migrated into a fixed version that more resembles ASIC implementations. Alternate or coordinating implementations may migrate VDE controller features to a final ASIC instead of or in addition to FPGAs. Depending on the implementation all of the aforementioned embedded components and microprocessors may be considered the "CPU" and/or "processor" for the VDE.

Power Source

The power source 986 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 986 is connected to at least one of the interconnected subsequent components of the VDE thereby providing an electric current to all the interconnected components. In one example, the power source 986 is connected to the system bus component 904. In an alternative embodiment, an outside power source 986 is provided through a connection across the I/O 908 interface. For example, a USB and/or IEEE 1394 connection carries both data and power across the connection and is therefore a suitable source of power.

Interface Adapters

Interface bus(ses) 907 may accept, connect, and/or communicate to a number of interface adapters, frequently, although not necessarily in the form of adapter cards, such as but not limited to: input output interfaces (I/O) 908, storage interfaces 909, network interfaces 910, and/or the like. Optionally, cryptographic processor interfaces 927 similarly may be connected to the interface bus. The interface bus provides for the communications of interface adapters with one another as well as with other components of the computer systemization. Interface adapters are adapted for a compatible interface bus. Interface adapters may connect to the interface bus via expansion and/or slot architecture. Various expansion and/or slot architectures may be employed, such as, but not limited to: Accelerated Graphics Port (AGP), Card Bus, ExpressCard, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), Thunderbolt, and/or the like.

Storage interfaces 909 may accept, communicate, and/or connect to a number of storage devices such as, but not limited to: storage devices 914, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, Ethernet, fiber channel, Small Computer Systems Interface (SCSI), Thunderbolt, Universal Serial Bus (USB), and/or the like.

Network interfaces 910 may accept, communicate, and/or connect to a communications network 913. Through a communications network 913, the VDE controller is accessible through remote clients 933b (e.g., computers with web browsers) by users 933a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed VDE), architectures may similarly be employed to pool, load balance, and/or otherwise increase the communicative bandwidth required by the VDE controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 910 may be used to engage with various communications network types 913. For example, multiple network interfaces may be employed to allow for the communication over broadcast, multicast, and/or unicast networks.

Input Output interfaces (I/O) 908 may accept, communicate, and/or connect to user input devices 911, peripheral devices 912, cryptographic processor devices 928, and/or the like. I/O may employ connection protocols such as, but not limited to: audio: analog, digital, monaural, RCA, stereo, and/or the like; data: Apple Desktop Bus (ADB), Bluetooth, IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, DisplayPort, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may be a video display, which may take the form of a Cathode Ray Tube (CRT), Liquid Crystal Display (LCD), Light Emitting Diode (LED), Organic Light Emitting Diode (OLED), Plasma, and/or the like based monitor with an interface (e.g., VGA, DVI circuitry and cable) that accepts signals from a video interface. The video interface composites information generated by a computer systemization and generates video signals based on the composited information in a video memory frame. Another output device is a television set, which accepts signals from a video interface. Often, the video interface provides the composited video information through a video connection interface that accepts a video display interface (e.g., an RCA composite video connector accepting an RCA composite video cable; a DVI connector accepting a DVI display cable, HDMI, etc.).

User input devices 911 often are a type of peripheral device 912 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 912 may be connected and/or communicate to I/O and/or other facilities of the like such as network interfaces, storage interfaces, directly to the interface bus, system bus, the CPU, and/or the like. Peripheral devices may be external, internal and/or part of the VDE controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 928), force-feedback devices (e.g., vibrating motors), near field communication (NFC) devices, network interfaces, printers, radio frequency identifiers (RFIDs), scanners, storage devices, transceivers (e.g., cellular, GPS, etc.), video devices (e.g., goggles, monitors, etc.), video sources, visors, and/or the like. Peripheral devices often include types of input devices (e.g., microphones, cameras, etc.).

It should be noted that although user input devices and peripheral devices may be employed, the VDE controller may be embodied as an embedded, dedicated, and/or monitor-less (i.e., headless) device, wherein access may be provided over a network interface connection.

Cryptographic units such as, but not limited to, microcontrollers, processors 926, interfaces 927, and/or devices 928 may be attached, and/or communicate with the VDE controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: the Broadcom's CryptoNetX and other Security Processors; nCipher's nShield (e.g., Solo, Connect, etc.), SafeNet's Luna PCI (e.g., 7100) series; Semaphore Communications' 40 MHz Roadrunner 184; sMIP's (e.g., 208956); Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 929. However, memory is a fungible technology and resource, thus, any number of memory embodiments may be employed in lieu of or in concert with one another. It is to be understood that the VDE controller and/or a computer systemization may employ various forms of memory 929. For example, a computer systemization may be configured wherein the operation of on-chip CPU memory (e.g., registers), RAM, ROM, and any other storage devices are provided by a paper punch tape or paper punch card mechanism; however, such an embodiment may result in an extremely slow rate of operation. In one configuration, memory 929 may include ROM 906, RAM 905, and a storage device 914. A storage device 914 may employ any number of computer storage devices/systems. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 929 may contain a collection of program and/or database components and/or data such as, but not limited to: operating system component(s) 915 (operating system); information server component(s) 916 (information server); user interface component(s) 917 (user interface); Web browser component(s) 918 (Web browser); database(s) 919; mail server component(s) 921; mail client component(s) 922; cryptographic server component(s) 920 (cryptographic server); the VDE component(s) 935; and/or the like (i.e., collectively a component collection). These components may be stored and accessed from the storage devices and/or from storage devices accessible through an interface bus. Although non-conventional program components such as those in the component collection may be stored in a local storage device 914, they may also be loaded and/or stored in memory such as: peripheral devices, RAM, remote storage facilities through a communications network, ROM, various forms of memory, and/or the like.

Operating System

The operating system component 915 is an executable program component facilitating the operation of the VDE controller. The operating system may facilitate access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. In addition, emobile operating systems such as Apple's iOS, Google's Android, Hewlett Packard's WebOS, Microsofts Windows Mobile, and/or the like may be employed. Any of these operating systems may be embedded within the hardware of the NICK controller, and/or stored/loaded into memory/storage. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the VDE controller to communicate with other entities through a communications network 913. Various communication protocols may be used by the VDE controller as a subcarrier transport mechanism for interaction, such as, but not limited to: multicast, TCP/IP, UDP, unicast, and/or the like.

Information Server

An information server component 916 is a stored program component that is executed by a CPU. The information server may be an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Apple's iMessage, Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the VDE controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the VDE database 919, operating systems, other program components, user interfaces, Web browsers, and/or the like.

Access to the VDE database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the VDE. In one embodiment, the information server may provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the VDE as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua and iOS's Cocoa Touch, IBM's OS/2, Google's Android Mobile UI, Microsoft's Windows 2000/2003/3.1/95/98/CE/Millenium/Mobile/NT/XP/Vista/7/8 (i.e., Aero, Metro), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface, any of which may be used and) provide a baseline and means of accessing and displaying information graphically to users.

A user interface component 917 is a stored program component that is executed by a CPU. The user interface may be a graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 918 is a stored program component that is executed by a CPU. The Web browser may be a hypertext viewing application such as Goofle's (Mobile) Chrome, Microsoft Internet Explorer, Netscape Navigator, Apple's (Mobile) Safari, embedded web browser objects such as through Apple's Cocoa (Touch) object class, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., Chrome, FireFox, Internet Explorer, Safari Plug-in, and/or the like APIs), and/or the like. Web browsers and like information access tools may be integrated into PDAs, cellular telephones, smartphones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application may similarly effect the obtaining and the provision of information to users, user agents, and/or the like from the VDE equipped nodes. The combined application may be nugatory on systems employing standard Web browsers.

Mail Server

A mail server component 921 is a stored program component that is executed by a CPU 903. The mail server may be an Internet mail server such as, but not limited to Apple's Mail Server (3), dovect, sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server may route, forward, and process incoming and outgoing mail messages that have been sent, relayed and/or otherwise traversing through and/or to the VDE.

Access to the VDE mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 922 is a stored program component that is executed by a CPU 903. The mail client may be a mail viewing application such as Apple (Mobile) Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 920 is a stored program component that is executed by a CPU 903, cryptographic processor 926, cryptographic processor interface 927, cryptographic processor device 928, and/or the like. Cryptographic processor interfaces will allow for expedition of encryption and/or decryption requests by the cryptographic component; however, the cryptographic component, alternatively, may run on a CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the VDE may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the VDE component to engage in secure transactions if so desired. The cryptographic component facilitates the secure accessing of resources on the VDE and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The VDE Database

The VDE database component 919 may be embodied in a database and its stored data. The database is a stored program component, which is executed by the CPU; the stored program component portion configuring the CPU to process the stored data. The database may be any of a number of fault tolerant, relational, scalable, secure databases, such as DB2, MySQL, Oracle, Sybase, and/or the like. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the VDE database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases may include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the VDE database is implemented as a data-structure, the use of the VDE database 919 may be integrated into another component such as the VDE component 935. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 919 includes several tables 919*a-f*. A Users table 919*a* may include fields such as, but not limited to: user_id, user_device_id, username, password, dob, first_name, last_name, age, state, address_firstline, address_secondline, zipcode, devices_list, contact_info, contact_type, alt_contact_info, alt_contact_type, and/or the like. The Users table may support and/or track multiple entity accounts on a VDE. A Devices table 919*b* may include fields such as, but not limited to: device_ID, device_name, device_IP, device_GPS, device_MAC, device_serial, device_ECID, device_UDID, device_browser, device_type, device_model, device_version, device_OS, device_apps_list, device_securekey, wallet_app_installed_flag, and/or the like. An Apps table 919*c* may include fields such as, but not limited to: app_ID, app_name, app_type, app_dependencies, app_access_code, user_pin, and/or the like. A Video File table 919*d* may include fields such as, but not limited to: video_id, video_name, video_size, video_type, video_length, video_compression, video_description, video_rating, video_source, video_url, video_copyright, video_samplejframe, video_ownership, video_download_times, video_segment_id, video_segment_duration, video_segment_label, video_segment_size, and/or the like. A Log table 919*e* may include fields such as, but not limited to: log_id, log_timestamp, log_date, log_user_id, log_device_id, log_server_ip, log_download_time, log_video_id, log_video_name, log_event, log_alert, log_app_it, and/or the like. A Protocol table 919*f* may include fields such as, but not limited to: protocol_id, protocol_name, protocol_description, protocol_applicable_device, protocol_app_id, protocol_version, protocol_copyright, protocol_content, and/or the like.

In one embodiment, the VDE database may interact with other database systems. For example, employing a distributed database system, queries and data access by search VDE component may treat the combination of the VDE database, an integrated data security layer database as a single database entity.

In one embodiment, user programs may contain various user interface primitives, which may serve to update the VDE. Also, various accounts may require custom database tables depending upon the environments and the types of clients the VDE may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 919a-f. The VDE may be configured to keep track of various settings, inputs, and parameters via database controllers.

The VDE database may communicate to and/or with other components in a component collection, including itself, and/or facilities of the like. Most frequently, the VDE database communicates with the VDE component, other program components, and/or the like. The database may contain, retain, and provide information regarding other nodes and data.

The VDEs

The VDE component 935 is a stored program component that is executed by a CPU. In one embodiment, the VDE component incorporates any and/or all combinations of the aspects of the VDE discussed in the previous figures. As such, the VDE affects accessing, obtaining and the provision of information, services, transactions, and/or the like across various communications networks. The features and embodiments of the VDE discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the VDE's features and facilities, and in many cases reduce the costs, energy consumption/requirements, and extend the life of VDE's underlying infrastructure; this has the added benefit of making the VDE more reliable. Similarly, many of the features and mechanisms are designed to be easier for users to use and access, thereby broadening the audience that may enjoy/employ and exploit the feature sets of the VDE; such ease of use also helps to increase the reliability of the VDE. In addition, the feature sets include heightened security as noted via the Cryptographic components 920, 926, 928 and throughout, making access to the features and data more reliable and secure.

The VDE component may transform Internet content data access request via VDE components, such as but not limited to Metric Data Manager component 942 (e.g., see 148 in FIG. 1; see also FIG. 2), Download File Manager Component 943 (e.g., see 146 in FIG. 1; see also FIG. 2), Session Bandwidth Monitor component 944 (e.g., see in FIG. 1; see also FIG. 2, FIG. 4), Download Utility component 945 (e.g., see 142 in FIG. 1; see also FIG. 2, FIG. 4), File Segment Engine component 947 (e.g., see 143 in FIG. 1; see also FIG. 4), Interactive Video Presentation component 948 (e.g., see 150 in FIG. 1), Search Engine Component 949 (e.g., see 151 in FIG. 1), and/or the like into media content playback at a client device, and/or the like and use of the VDE.

The VDE component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); Representational State Transfer (REST); SWFObject; Yahoo! User Interface; and/or the like), WebObjects, and/or the like. In one embodiment, the VDE server employs a cryptographic server to encrypt and decrypt communications. The VDE component may communicate to and/or with other components in a component collection, including itself, and/or facilities of the like. Most frequently, the VDE component communicates with the VDE database, operating systems, other program components, and/or the like. The VDE may contain, communicate, generate, obtain, and/or provide program component, system, user, and/or data communications, requests, and/or responses.

Distributed VDEs

The structure and/or operation of any of the VDE node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that may dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the VDE controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c -post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the VDE controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of message
do {
   $input = "";
   $input = socket_read($client, 1024);
   $data .= $input;
} while($input != "");
// parse data to extract variables
$obj = json_decode($data, true);
// store input data in a database
mysql_connect("201.408.185.132",$DBserver,$password); // access database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm
    .IBMDI.doc/referenceguide295.htm and other parser implementations:

http://publib.boulder.ibm.com/infocenter/tivihelp/v2r1/index.jsp?topic=/com.ibm
    .IBMDI.doc/referenceguide259.htm all of which are hereby expressly incorporated by reference herein.

Additional embodiments of the VDE may include:

1. A latency-reducing throughput-enhancing processor-implemented method embodiment, comprising:

obtaining a first data or media content file delivery request at a server from a user device;

transmitting a first portion of a data or media content file from the server to the user device;

issuing a notification or a user interface element indicating playback availability of the first portion of the data or media content file to the user device upon completion of, or at a calculated point in time subsequent to, delivery of the first portion of the data or media content file;

receiving a second data or media content file delivery request at the server from the user device, wherein the second data or media content file delivery request is triggered by any of the following:

when the user initiates playback of said first media content file;

or by playback of the transmitted first portion of the media content file via a user interface instantiated on the user device;

or automatically upon initiation of playback;

or automatically preceding initiation of playback;

or automatically at a point in time subsequent to playback; and may further comprise initiating a background delivery of the second portion of the data or media content file from the server to the user device that may be in parallel to the playback of the transmitted first portion of the data or media content file on the user device, wherein the transmitted first portion of the data or media content file may have a sufficient playback length of time to facilitate a window for downloading a portion of the second portion of the data or media content file.

2. The method of embodiment 1, wherein the first data or media content file delivery request is initiated by any of the server and the user device.

3. The method of embodiment 1, wherein the data or media content file is segmented into one or more segments and the first portion of the data or media content file contains one or more segments.

4. The method of embodiment 1, wherein a user initiates playback of the transmitted first portion of the data or media content file by engaging the provided user-interface element.

5. The method of embodiment 1, wherein the server comprises a plurality of servers in a datacenter, or a cloud environment, or a content delivery network, or a combination of these environments.

6. The method of embodiment 1, wherein the data or media content file comprises any of:

a video file;

an audio file;

a 3D holographic digital data:

a digital data to be processed or displayed by a volumetric display device, or any other 3D or 2D imaging device.

7. The method of embodiment 1, wherein the user device is intermittently or continuously connected to the server.

8. The method of embodiment 1, further comprising calculating a requirement for a duration of video or data playback that is satisfied by the first portion of the data or media content file, said requirement for a duration of data or video playback is performed in order to provide a sufficient time window.

9. The method of embodiment 8, wherein the calculating requirement for said sufficient time window is based on at least one of:

a data throughput rate at which data is transferred from said server to said client;

a data throughput rate that is required to deliver all, or a portion of, the process two data;

an amount of time required to deliver all, or a portion of, the process two data;

a data throughput rate that is required to deliver the process two data within a time frame commensurate to its playback duration;

a predicted data throughput rate at which data is transferred from said server to said client at a future point in time;

an amount of data that the process two data is comprised of; or a duration of playback that will be performed by the process two data.

10. The method of embodiment 1, wherein the second portion of the data or media content file comprises any of:

a subsequent portion of a larger whole data or larger whole media content file; or a discrete data or media content file that is unique or different from the preceding data or media content file.

11. The method of embodiment 8, wherein the sufficient time window is an amount of time necessary to facilitate a sufficient amount of said process two data to be transferred at a future point in time.

12. The method of embodiment 1, wherein the playback of the transmitted first portion of the media content file is automatically initiated on the user device upon completion of transmission.

13. The method of embodiment 1, further comprising segmenting a data or media content file.

14. The method of embodiment 1, further comprising predicting said data throughput rate at which data is transferred from the server to the user device at a future point in time.

15. The method of embodiment 1, wherein said data throughput rate is predicted based on historical data gathered by client-side or server-side components and the utilization of this historical data to construct a predictive analysis.

16. The method of embodiment 1, further comprising: selecting the media content file; determining the first portion and the second portion of the media content file.

17. The method of embodiment 16, wherein the selection of the media content file is based on an analysis of any of the following:

encoded bit rate;

file size;

playback duration;

data throughput rate required for delivery of the media content file relative to a current data throughput rate.

18. The method of embodiment 1, further comprising: determining an optimum scheduling time for delivery of the first portion of the media content file.

19. A data transmission system embodiment, comprising:

a processor; and a memory disposed in communication with the processor and storing processor-issuable instructions to:

receive a first media content file delivery request at a server from a user device;

transmit a first portion of a media content file from the server to the user device;

provide a user interface element indicating playback availability of the first portion of the media content file to the user device upon completion of delivery of the first portion of the media content file;

receive a second media content file delivery request at the server from the user device, wherein the second media content file delivery request is triggered by playback of the transmitted first portion of the media content file via a user interface instantiated on the user device; and initiate a background delivery of a second portion of the media content file from the server to the user device in parallel to the playback of the transmitted first portion of the media content file on the user device, wherein the transmitted first portion of the media content file has a sufficient playback length of time for downloading a portion of the second portion of the media content file.

20. A processor-readable non-transitory medium embodiment storing processor-issuable data transmission instructions to:

transmit a first media content file delivery request to a server from a user device;

download a first portion of a media content file from the server at the user device;

obtain a user interface element indicating playback availability of the first portion of the media content file to the user device upon completion of delivery of the first portion of the media content file;

present the transmitted first portion of the media content file via a user interface instantiated on the user device;

transmit a second media content file delivery request at the server from the user device in response to the presentation of the transmitted first portion of the media content file;

determine the transmitted first portion of the media content file has a sufficient playback length of time for downloading the second portion of the media content file; and download a portion of the second portion of the media content file in the background from the server at the user device in parallel to the playback of the transmitted first portion of the media content file on the user device.

In order to address various issues and advance the art, the entirety of this application for VIDEO DELIVERY EXPEDITION APPARATUSES, METHODS AND SYSTEMS (including the Cover Page, Title, Headings, Field, Background, Summary, Brief Description of the Drawings, Detailed Description, Claims, Abstract, Figures, Appendices and/or otherwise) shows by way of illustration various example embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any data flow sequence(s), program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, processors, services, servers, and/or the like that may execute asynchronously, concurrently, in parallel, simultaneously, synchronously, and/or the like are also contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations, including the right to claim such innovations, file additional applications, continuations, continuations-in-part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a VDE individual and/or enterprise user, database configuration and/or relational model, data type, data transmission and/or network framework, syntax structure, and/or the like, various embodiments of the VDE may be implemented that allow a great deal of flexibility and customization. For example, aspects of the VDE may be adapted for data network bandwidth management. While various embodiments and discussions of the VDE have been directed to video transmission and streaming over a network, however, it is to be understood that the embodiments described herein may be readily configured and/or customized for a wide variety of other applications and/or implementations.

What is claimed is:

1. A system comprising:
    (a) one or more central processing units that execute one or more stored program components;
    (b) a single memory that stores a component collection, or a plurality of memory that collectively stores said component collection;
    (c) a number of said stored program components that are collectively said component collection, said component collection comprising instructions to:

obtain a data or media content file delivery request from a user client device;

provide a response to said user client device comprising a data communication comprising an automatic download or a background download, wherein said data communication comprises an initial number of segments comprising data, wherein said initial number of segments comprise a number of segments that a first portion of a data or media content file comprises, wherein said initial number of segments satisfy a calculated requirement for a duration of video playback or other digital content, wherein the calculating said requirement for said duration of video playback or other digital content was performed in order to provide a sufficient time window, wherein said sufficient time window is an amount of time necessary to facilitate a sufficient amount of an additional number of segments to be downloaded at a future point in time, wherein the calculating requirement for said sufficient time window was based on at least one of:
a data throughput rate at which data is transferred from a server to said client,
or a data throughput rate at which data may be transferred from said server to said client,
or a predicted data throughput rate at which data is transferred from said server to said client at a future point in time,
or a predicted data throughput rate at which data may be transferred from said server to said client at a future point in time,
or an amount of data that said additional number of segments is comprised of,
or a data throughput rate that is required to deliver all, or a portion of, said additional number of segments,
or an amount of time required to deliver all, or a portion of, said additional number of segments,
or a data throughput rate that is required to deliver said additional number of segments within a time frame commensurate to its playback duration,
or a data throughput rate that may be required to deliver said additional number of segments within a time frame commensurate to its playback duration,
or a duration of playback that will be performed by said additional number of segments,
wherein said additional number of segments comprises data that may be delivered in response to a triggering by a user-initiated playback of the initial segment or segments that were previously downloaded via said automatic download or said background download, or may be delivered in response to a second data or media content file delivery request;
issue a notification or a user interface element to said user device indicating playback availability of said first portion of said data or media content file, upon completion of, or at a calculated point in time subsequent to, delivery of said first portion of said data or media content file;
receive said second data or media content file delivery request from said user device, wherein said second data or media content file delivery request was triggered by any of the following:
when a user initiates playback of the first media content file,
or by playback of the transmitted first portion of said media content file via a user interface instantiated on the user device,
or automatically upon initiation of playback,
or automatically preceding initiation of playback,
or automatically at a point in time subsequent to playback;
provide a data communication to said client device, said data communication comprising said additional number of segments.

2. The system of claim 1, wherein said component collection may comprise multiple instances of any one of the program components in said program component collection that may be instantiated on a single node, and/or across numerous nodes, and/or said component collection may comprise single instances that may be distributed across multiple controllers and/or storage devices, and/or said component collection may comprise program component instances and controllers that may work in concert through standard data processing communication techniques, and/or said component collection may comprise consolidated and/or integrated program components resulting in a more distributed series of program components and/or resulting in some combination between a consolidated and distributed configuration, and/or said component collection may comprise instances of components consolidated into a common code base from the program component collection that may communicate, obtain, and/or provide data, and this may be accomplished through any type of intra-application data processing communication techniques, and/or said component collection may comprise components that are discrete, separate, and/or external to one another, and in this case communicating, obtaining, and/or providing data with and/or to other components may be accomplished through any type of inter-application data processing communication techniques.

3. The system of claim 1, wherein said component collection may be combined in any number of ways, which may be accomplished by integrating the components into a common code base or by dynamically loading the components on demand in an integrated fashion, and/or said component collection may be consolidated and/or distributed in any number of variations through standard data processing and/or development techniques.

4. A method for video delivery implemented by one or more processors and one or more memory, comprising:
obtaining a data or media content file delivery request from a user client device;
providing a response to said user client device comprising a data communication comprising an automatic download or a background download, wherein said data communication comprises an initial number of segments comprising data, wherein said initial number of segments comprise a number of segments that a first portion of a data or media content file comprises, wherein said initial number of segments satisfy a calculated requirement for a duration of video playback or other digital content, wherein the calculating said requirement for said duration of video playback or other digital content was performed in order to provide a sufficient time window, wherein said sufficient time window is an amount of time necessary to facilitate a sufficient amount of an additional number of segments to be downloaded at a future point in time, wherein the calculating requirement for said sufficient time window was based on at least one of:
a data throughput rate at which data is transferred from a server to said client,
or a data throughput rate at which data may be transferred from said server to said client,
or a predicted data throughput rate at which data is transferred from said server to said client at a future point in time,
or a predicted data throughput rate at which data may be transferred from said server to said client at a future point in time,
or an amount of data that said additional number of segments is comprised of,
or a data throughput rate that is required to deliver all, or a portion of, said additional number of segments,
or an amount of time required to deliver all, or a portion of, said additional number of segments, or a data throughput rate that is required to deliver said additional number of segments within a time frame commensurate to its playback duration, or a data throughput rate that may be required to deliver said additional number of segments within a time frame commensurate to its playback duration, or a duration of playback that will be performed by said additional number of segments, wherein said additional number of segments comprises data that may be delivered in response to a triggering by a user-initiated playback of the initial segment or segments that were previously downloaded via said automatic download or said background download, or may be delivered in response to a second data or media content file delivery request;

issuing a notification or a user interface element to said user device indicating playback availability of said first portion of said data or media content file, upon completion of, or at a calculated point in time subsequent to, delivery of said first portion of said data or media content file;

receiving said second data or media content file delivery request from said user device, wherein said second data or media content file delivery request was triggered by any of the following:

when a user initiates playback of the first media content file, or by playback of the transmitted first portion of said media content file via a user interface instantiated on the user device, or automatically upon initiation of playback, or automatically preceding initiation of playback, or automatically at a point in time subsequent to playback;

providing a data communication to said client device, said data communication comprising said additional number of segments.

5. The method of claim 4, wherein said initial number of segments may comprise a subset of a total number of segments that a video file or whole video comprises.

6. The method of claim 4, wherein the number of said initial number of segments may be more than one.

7. The method of claim 4, wherein the number of said initial number of segments may be one.

8. The method of claim 4, wherein said background download may be facilitated by a web service.

9. The method of claim 4, wherein said initial number of segments may comprise a number of said initial number of segments that are a subset of a total number of segments that a main content comprises.

10. The method of claim 4, wherein said initial number of segments may comprise a number of said initial number of segments that are a main content, and said initial number of segments may comprise a different number of said initial number of segments that comprise a pre-roll video.

11. The method of claim 4, wherein said initial number of segments may comprise a number of said initial number of segments that are a subset of a total number of segments that a main content comprises, and said initial number of segments may comprise a different number of said initial number of segments that comprise a pre-roll video.

12. The method of claim 4, wherein said calculated requirement may comprise factoring in a duration of a pre-roll video residing in a client-side file storage.

13. The method of claim 4, further comprising: issuing a time stamp to the client device.

14. The method of claim 4, further comprising: communicating a data communication to the client device, said data communication comprising a background download timestamp to initiate said automatic download.

15. The method of claim 4, further comprising: issuing a time stamp to the client device, wherein when said time stamp expires a program component at said client device may initiate an automatic process of downloading new segment data.

16. The method of claim 4, further comprising: communicating a data communication comprising a server-side triggered command to a program component at the client device to immediately execute initiation of an automatic process of downloading new segment data.

17. The method of claim 4, further comprising: determining or calculating or executing a requirement for a supplemental amount of data to be added to said initial number of segments on said client prior to the issuing of said notification or said user interface element.

18. The method of claim 17, wherein said supplemental amount of data may comprise video data or other digital content that may be queued for playback prior to a playback of said initial number of segments.

19. The method of claim 17, wherein said supplemental amount of data may comprise video data or other digital content that may be queued for playback at an edit point prior to the consummation of playback of said initial number of segments.

20. The method of claim 17, wherein said supplemental amount of data may comprise video data or other digital content that may be queued for playback after the consummation of playback of said initial number of segments.

21. The method of claim 4, wherein said data or media content file may comprise any of: a video file, an audio file, a 3d holographic digital data, a digital data to be processed or displayed by a volumetric display device, or any other 3d or 2d imaging device.

22. The method of claim 4, wherein said initial number of segments may comprise at least one of said initial number of segments that may comprise a portion of data comprising an object or group of objects.

23. The method of claim 4, wherein said additional number of segments may comprise only one segment.

24. The method of claim 4, wherein said additional number of segments may comprise a number of segments that is greater than one.

25. The method of claim 4, wherein said additional number of segments may comprise a number of segments that a second portion of said data or media content file comprises.

26. The method of claim 25, wherein said second portion of said data or media content file may comprise a subsequent portion of a larger whole data or larger whole media content file.

27. The method of claim 25, wherein said second portion of said data or media content file may comprise a discrete data or media content file that is unique or different from a preceding data or media content file.

28. The method of claim 4, wherein said additional number of segments may comprise a subsequent portion of a video or other digital content of which said initial number of segments comprised an initial portion.

29. The method of claim 4, wherein said additional number of segments may comprise a discrete video that is different from a discrete video or other digital content derived from said initial number of segments.

30. The method of claim 4, further comprising: initiating a background delivery of said additional number of segments from said server to said user device that may be in parallel to the playback of said initial number of segments on said user device.

31. The method of claim 4, wherein said initial number of segments may comprise a sufficient playback length of time to facilitate a window for downloading a portion of said additional number of segments.

32. The method of claim 4, wherein said background download may comprise a background download of video file segments.

33. The method of claim 4, further comprising: implementing an interface via a web service that may facilitate said background download.

34. The method of claim 4, further comprising: implementing an interface via a web service that may facilitate a background download of video file segments.

35. The method of claim 34, wherein said background download of video file segments may comprise a subset of a total number of segments that a whole video comprises.

36. The method of claim 4, further comprising: scheduling a download that may involve a server issuing a time stamp to said client.

37. The method of claim 4, further comprising: calculating a proposed download time for said initial number of segments.

38. The method of claim 4, wherein said additional number of segments may comprise a balance of missing segments that may comprise a scalable type of file, or any type of scalable streaming technology.

39. The method of claim 4, wherein said additional number of segments may comprise additional data that adds upon a base layer.

40. The method of claim 4, wherein said server may refer generally to a computer, other device, program, or combination thereof that processes and responds to the requests of remote users across a communications network, wherein said servers may serve their information to requesting clients, wherein said clients may refer generally to a computer, a program, an other device, a user and/or combination thereof that may be capable of processing and making requests and obtaining and processing any responses from servers across a communications network, said network generally thought to facilitate the transfer of information from source points to destinations, wherein said networks may comprise many forms of networks such as local area networks, pico networks, wide area networks, wireless networks, and other forms of networks, and/or may comprise the internet, which is generally accepted as being an interconnection of a multitude of networks whereby remote clients and servers may access and interoperate with one another.

41. The method of claim 4, wherein said client device may be representative of numerous end-user devices, and these may include personal computers, mobile devices, and/or other types of devices.

42. The method of claim 4, wherein said user device may comprise a peripheral device that may be external, internal and/or part of a controller, and/or may be connected and/or communicate to i/o (input/output) and/or other facilities of the like such as network interfaces, storage interfaces, directly to an interface bus, system bus, a central processing unit, and/or the like, and/or may comprise a transceiver, said peripheral device may comprise a video device, said peripheral device may comprise goggles, or visors, and/or the like.

43. A method for video delivery implemented by one or more processors and one or more memory, comprising:

receiving at a user client device a data communication comprising an automatic download or a background download, wherein said data communication comprises an initial number of segments comprising data, wherein said initial number of segments comprise a number of segments that a first portion of a data or media content file comprises, wherein said initial number of segments satisfy a calculated requirement for a duration of video playback or other digital content, wherein the calculating said requirement for said duration of video playback or other digital content was performed in order to provide a sufficient time window, wherein said sufficient time window is an amount of time necessary to facilitate a sufficient amount of an additional number of segments to be downloaded at a future point in time, wherein the calculating requirement for said sufficient time window was based on at least one of:

a data throughput rate at which data is transferred from a server to said client, or a data throughput rate at which data may be transferred from said server to said client, or a predicted data throughput rate at which data is transferred from said server to said client at a future point in time, or a predicted data throughput rate at which data may be transferred from said server to said client at a future point in time, or an amount of data that said additional number of segments is comprised of, or a data throughput rate that is required to deliver all, or a portion of, said additional number of segments, or an amount of time required to deliver all, or a portion of, said additional number of segments, or a data throughput rate that is required to deliver said additional number of segments within a time frame commensurate to its playback duration, or a data throughput rate that may be required to deliver said additional number of segments within a time frame commensurate to its playback duration, or a duration of playback that will be performed by said additional number of segments, wherein said additional number of segments comprises data that may be delivered in response to a triggering by a user-initiated playback of the initial segment or segments that were previously downloaded via said automatic download or said background download, or may be delivered in response to a second data or media content file delivery request;

issuing a notification or a user interface element indicating playback availability of said first portion of said data or media content file, upon completion of, or at a calculated point in time subsequent to, delivery of said first portion of said data or media content file;

transmitting said second data or media content file delivery request from said user device, wherein said second data or media content file delivery request was triggered by any of the following:

when a user initiates playback of the first media content file, or by playback of the transmitted first portion of said media content file via a user interface instantiated on the user device, or automatically upon initiation of playback, or automatically preceding initiation of playback, or automatically at a point in time subsequent to playback;

receiving a data communication at said client device, said data communication comprising said additional number of segments.

44. The method of claim 43, wherein said client device may be representative of numerous end-user devices, and these may include personal computers, mobile devices, and/or other types of devices.

45. The method of claim 43, wherein said user device may comprise a peripheral device that may be external, internal and/or part of a controller, and/or may be connected and/or communicate to i/o (input/output) and/or other facilities of the like such as network interfaces, storage interfaces, directly to an interface bus, system bus, a central processing unit, and/or the like, and/or may comprise a transceiver, said peripheral device may comprise a video device, said peripheral device may comprise goggles, or visors, and/or the like.

46. A non-transitory computer readable medium that comprises instructions to:

receive at a user client device a data communication comprising an automatic download or a background download, wherein said data communication comprises an initial number of segments comprising data, wherein said initial number of segments comprise a number of segments that a first portion of a data or media content file comprises, wherein said initial number of segments satisfy a calculated requirement for a duration of video playback or other digital content, wherein the calculating said requirement for said duration of video playback or other digital content was performed in order to provide a sufficient time window, wherein said sufficient time window is an amount of time necessary to facilitate a sufficient amount of an additional number of segments to be downloaded at a future point in time, wherein the calculating requirement for said sufficient time window was based on at least one of:

a data throughput rate at which data is transferred from a server to said client, or a data throughput rate at which data may be transferred from said server to said client, or a predicted data throughput rate at which data is transferred from said server to said client at a future point in time, or a predicted data throughput rate at which data may be transferred from said server to said client at a future point in time, or an amount of data that said additional number of segments is comprised of, or a data throughput rate that is required to deliver all, or a portion of, said additional number of segments, or an amount of time required to deliver all, or a portion of, said additional number of segments, or a data throughput rate that is required to deliver said additional number of segments within a time frame commensurate to its playback duration, or a data throughput rate that may be required to deliver said additional number of segments within a time frame commensurate to its playback duration, or a duration of playback that will be performed by said additional number of segments, wherein said additional number of segments comprises data that may be delivered in response to a triggering by a user-initiated playback of the initial segment or segments that were previously downloaded via said automatic download or said background download, or may be delivered in response to a second data or media content file delivery request;

issue a notification or a user interface element indicating playback availability of said first portion of said data or media content file, upon completion of, or at a calculated point in time subsequent to, delivery of said first portion of said data or media content file;

transmit said second data or media content file delivery request from said user device, wherein said second data or media content file delivery request was triggered by any of the following:

when a user initiates playback of the first media content file, or by playback of the transmitted first portion of said media content file via a user interface instantiated on the user device, or automatically upon initiation of playback, or automatically preceding initiation of playback, or automatically at a point in time subsequent to playback;

receive a data communication at said client device, said data communication comprising said additional number of segments.

* * * * *